US010965908B1

(12) United States Patent
Ostap et al.

(10) Patent No.: US 10,965,908 B1
(45) Date of Patent: Mar. 30, 2021

(54) ADVANCED VIDEO CONFERENCING SYSTEMS AND METHODS

(71) Applicant: Logitech Europe S.A., Lausanne (CH)

(72) Inventors: Oleg Ostap, Camas, WA (US); Henry Levak, San Mateo, CA (US); John Scott Skeehan, San Ramon, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/833,940

(22) Filed: Mar. 30, 2020

(51) Int. Cl.
*H04N 7/14* (2006.01)
*H04N 5/232* (2006.01)
*H04N 7/15* (2006.01)

(52) U.S. Cl.
CPC ....... *H04N 7/147* (2013.01); *H04N 5/232933* (2018.08); *H04N 7/15* (2013.01)

(58) Field of Classification Search
USPC ..................... 348/14.01, 14.09, 14.02, 14.08
See application file for complete search history.

(56) References Cited

U.S. PATENT DOCUMENTS

| | | | |
|---|---|---|---|
| 5,434,617 | A | 7/1995 | Bianchi |
| 6,069,655 | A | 5/2000 | Seeley et al. |
| 6,240,303 | B1 | 5/2001 | Katzur |
| 6,353,461 | B1 | 3/2002 | Shore |
| 6,392,694 | B1 | 5/2002 | Bianchi |
| 6,519,648 | B1 | 2/2003 | Eyal |
| 6,611,281 | B2 | 8/2003 | Strubbe |
| 6,731,334 | B1 | 5/2004 | Maeng et al. |
| 6,803,945 | B1 | 10/2004 | Needham |
| 6,829,391 | B2 | 12/2004 | Comaniciu et al. |
| 6,995,794 | B2 | 2/2006 | Hsu et al. |
| 7,133,513 | B1 | 11/2006 | Zhang |
| 7,298,733 | B2 | 11/2007 | Sakai et al. |
| 7,349,008 | B2 | 3/2008 | Rui et al. |
| 7,433,327 | B2 | 10/2008 | Harville et al. |
| 7,746,401 | B2 | 6/2010 | Wu et al. |
| 7,876,923 | B2 | 1/2011 | Finnegan et al. |

(Continued)

OTHER PUBLICATIONS

AVer VCLink & ScreenShare. http://www.averusa.com/video-collaboration/products/vclink-and-screenshare.asp. 1991-2015.

(Continued)

*Primary Examiner* — Maria El-Zoobi
(74) *Attorney, Agent, or Firm* — Patterson + Sheridan, L.L.P.

(57) ABSTRACT

The present disclosure generally provides for advanced single camera video conferencing systems, and methods related thereto. The advanced single camera video conferencing system features a hybrid optical/digital camera, herein a camera device, having a controller that is configured to execute one or more of the methods set forth herein. In one embodiment, a method includes optically framing, a first portion of a video conferencing environment to provide an actual field-of-view, digitally framing a second portion of the video conferencing environment to provide an apparent field-of-view that is encompassed within the actual field-of-view, generating a video stream of the apparent field-of-view, surveying the actual field-of-view to generate survey data, and detecting changes in the survey data over time. The method may be performed using a single camera device using a single image sensor.

18 Claims, 13 Drawing Sheets

(56) References Cited

U.S. PATENT DOCUMENTS

| | | |
|---|---|---|
| 7,940,432 B2 | 5/2011 | Shih et al. |
| 8,094,193 B2 | 1/2012 | Peterson et al. |
| 8,237,764 B1 | 8/2012 | Chen et al. |
| 8,244,103 B1 | 8/2012 | Shore |
| 8,284,254 B2 | 10/2012 | Romanowich et al. |
| 8,358,328 B2 | 1/2013 | Friel et al. |
| 8,368,752 B2 | 2/2013 | Lin et al. |
| 8,396,007 B2 | 3/2013 | Gonia et al. |
| 8,471,889 B1 | 6/2013 | Lee et al. |
| 8,520,072 B1 | 8/2013 | Slavin |
| 8,547,414 B2 | 10/2013 | Sheeley |
| 8,659,638 B2 | 2/2014 | Chao et al. |
| 8,744,125 B2 | 6/2014 | Zhu |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,077,906 B1 | 7/2015 | Tsai et al. |
| 9,125,138 B2 | 9/2015 | Abuan et al. |
| 9,125,146 B1 | 9/2015 | Edara et al. |
| 9,197,856 B1 | 11/2015 | Tangeland et al. |
| 9,237,307 B1 | 1/2016 | Vendrow |
| 9,270,941 B1 | 2/2016 | Lavelle |
| 9,286,693 B2 | 3/2016 | Yoo |
| 9,307,191 B2 | 4/2016 | Berrett et al. |
| 9,313,556 B1 | 4/2016 | Borel et al. |
| 9,338,395 B2 | 5/2016 | Wang et al. |
| 9,547,678 B2 | 1/2017 | Wnuk |
| 9,549,153 B1 | 1/2017 | Delorenzi et al. |
| 9,763,029 B2 | 9/2017 | Mirza et al. |
| 9,785,772 B1 | 10/2017 | Johansson et al. |
| 9,798,933 B1 | 10/2017 | Meisser et al. |
| 9,801,234 B2 | 10/2017 | Caine et al. |
| 9,805,567 B2 | 10/2017 | Borel et al. |
| 9,942,661 B2 | 4/2018 | Dusse et al. |
| 10,115,396 B2 | 10/2018 | Anderson et al. |
| 10,268,759 B1 | 4/2019 | Witt et al. |
| 10,341,792 B1 | 7/2019 | Zhang et al. |
| 10,360,457 B2 | 7/2019 | Meisser et al. |
| 2002/0106137 A1 | 8/2002 | Chen et al. |
| 2004/0003409 A1 | 1/2004 | Berstis |
| 2004/0027242 A1 | 2/2004 | Venetianer et al. |
| 2004/0080627 A1 | 4/2004 | Kroll |
| 2005/0014490 A1 | 1/2005 | Desai et al. |
| 2005/0160457 A1 | 7/2005 | Rui et al. |
| 2005/0168574 A1 | 8/2005 | Lipton et al. |
| 2005/0271251 A1 | 12/2005 | Russell |
| 2005/0289224 A1 | 12/2005 | Deslippe et al. |
| 2006/0009985 A1 | 1/2006 | Ko et al. |
| 2006/0069797 A1 | 3/2006 | Abdo et al. |
| 2006/0095339 A1 | 5/2006 | Hayashi et al. |
| 2007/0002141 A1 | 1/2007 | Lipton et al. |
| 2007/0024706 A1 | 2/2007 | Brannon et al. |
| 2007/0048712 A1 | 3/2007 | Plastina et al. |
| 2008/0018737 A1 | 1/2008 | Suzuki et al. |
| 2008/0021879 A1 | 1/2008 | Cheng |
| 2008/0089268 A1 | 4/2008 | Kinder et al. |
| 2008/0100704 A1 | 5/2008 | Venetianer et al. |
| 2008/0192666 A1 | 8/2008 | Koskan et al. |
| 2009/0015658 A1 | 1/2009 | Enstad et al. |
| 2009/0031381 A1 | 1/2009 | Cohen |
| 2009/0141939 A1 | 6/2009 | Chambers et al. |
| 2009/0174530 A1 | 7/2009 | Yen et al. |
| 2009/0219300 A1 | 9/2009 | Peleg et al. |
| 2009/0284579 A1 | 11/2009 | Knaz |
| 2009/0298420 A1 | 12/2009 | Haartsen et al. |
| 2010/0082585 A1 | 4/2010 | Barsook et al. |
| 2010/0092037 A1 | 4/2010 | Peleg et al. |
| 2010/0135643 A1 | 6/2010 | Fleming |
| 2010/0284389 A1 | 11/2010 | Ramsay et al. |
| 2010/0308765 A1 | 12/2010 | Moore et al. |
| 2010/0315497 A1 | 12/2010 | Jiang |
| 2011/0050843 A1 | 3/2011 | Cheng et al. |
| 2011/0055256 A1 | 3/2011 | Phillips et al. |
| 2011/0074570 A1 | 3/2011 | Feldstein |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0129048 A1 | 6/2011 | Barbe et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2011/0158441 A1 | 6/2011 | Batra |
| 2011/0161836 A1 | 6/2011 | Mu et al. |
| 2011/0197214 A1 | 8/2011 | Burton et al. |
| 2011/0223893 A1 | 9/2011 | Lau et al. |
| 2011/0285842 A1 | 11/2011 | Davenport et al. |
| 2012/0019611 A1 | 1/2012 | Wu et al. |
| 2012/0169883 A1 | 7/2012 | Chang et al. |
| 2012/0170802 A1 | 7/2012 | Millar |
| 2012/0223960 A1 | 9/2012 | Chiang et al. |
| 2012/0268626 A1 | 10/2012 | Lu et al. |
| 2012/0308077 A1 | 12/2012 | Tseng |
| 2013/0007499 A1 | 1/2013 | Moy |
| 2013/0024891 A1 | 1/2013 | Elend |
| 2013/0174223 A1 | 7/2013 | Dykeman et al. |
| 2013/0183958 A1 | 7/2013 | Wesby |
| 2013/0194378 A1 | 8/2013 | Brown |
| 2013/0329003 A1 | 12/2013 | Hsia et al. |
| 2013/0335508 A1 | 12/2013 | Mauchly |
| 2014/0012990 A1 | 1/2014 | Ko |
| 2014/0013228 A1 | 1/2014 | Hutten |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0049595 A1 | 2/2014 | Feng et al. |
| 2014/0092201 A1 | 4/2014 | Williams |
| 2014/0111600 A1 | 4/2014 | Schaefer et al. |
| 2014/0115115 A1 | 4/2014 | Kuang |
| 2014/0176708 A1 | 6/2014 | Ramakrishnan |
| 2014/0178043 A1 | 6/2014 | Kritt et al. |
| 2014/0186026 A1 | 7/2014 | Oshima et al. |
| 2014/0213227 A1 | 7/2014 | Rao |
| 2014/0274203 A1 | 9/2014 | Ganong, III et al. |
| 2014/0313282 A1 | 10/2014 | Ma et al. |
| 2014/0313346 A1 | 10/2014 | Huang et al. |
| 2014/0355907 A1 | 12/2014 | Pesavento et al. |
| 2015/0015735 A1 | 1/2015 | Rav-Acha et al. |
| 2015/0022636 A1 | 1/2015 | Savransky |
| 2015/0091737 A1 | 4/2015 | Richardson |
| 2015/0103179 A1 | 4/2015 | Galvin |
| 2015/0109399 A1 | 4/2015 | Kuscher et al. |
| 2015/0110259 A1 | 4/2015 | Kaye et al. |
| 2015/0156257 A1 | 6/2015 | Li et al. |
| 2015/0189402 A1 | 7/2015 | Outtagarts et al. |
| 2015/0208352 A1 | 7/2015 | Backholm et al. |
| 2015/0254435 A1 | 9/2015 | Fells |
| 2015/0256577 A1 | 9/2015 | Gutierrez Vilaro et al. |
| 2015/0289295 A1 | 10/2015 | Granbery |
| 2015/0296187 A1 | 10/2015 | Baldwin |
| 2015/0326638 A1 | 11/2015 | Yarygin |
| 2015/0350611 A1 | 12/2015 | Pearson et al. |
| 2015/0379021 A1 | 12/2015 | Kuper |
| 2016/0012609 A1 | 1/2016 | Laska |
| 2016/0027262 A1 | 1/2016 | Skotty |
| 2016/0055381 A1 | 2/2016 | Adsumilli |
| 2016/0057385 A1 | 2/2016 | Burenius |
| 2016/0073055 A1 | 3/2016 | Marsh |
| 2016/0132563 A1 | 5/2016 | Bhandari et al. |
| 2016/0133297 A1 | 5/2016 | Thornton |
| 2016/0156992 A1 | 6/2016 | Kuper |
| 2016/0173818 A1 | 6/2016 | Su et al. |
| 2016/0173821 A1 | 6/2016 | De Magalhaes |
| 2016/0198410 A1 | 7/2016 | Cherniavsky et al. |
| 2016/0205716 A1 | 7/2016 | Wu et al. |
| 2016/0212332 A1* | 7/2016 | Tang ............... G02B 26/0875 |
| 2016/0286166 A1 | 9/2016 | Sandvik et al. |
| 2016/0291861 A1 | 10/2016 | Song et al. |
| 2016/0295128 A1 | 10/2016 | Schnittman et al. |
| 2016/0321506 A1 | 11/2016 | Fridental |
| 2017/0004629 A1 | 1/2017 | Zhao |

(56) References Cited

U.S. PATENT DOCUMENTS

| | | | |
|---|---|---|---|
| 2017/0006162 | A1 | 1/2017 | Bargetzi et al. |
| 2017/0041376 | A1 | 2/2017 | Lin et al. |
| 2017/0064599 | A1 | 3/2017 | Caine et al. |
| 2017/0163748 | A1 | 6/2017 | Shirriff et al. |
| 2017/0174068 | A1 | 6/2017 | Koch et al. |
| 2017/0244643 | A1 | 8/2017 | Lawrence et al. |
| 2017/0324932 | A1* | 11/2017 | Tangeland ............... H04N 7/15 |
| 2017/0353907 | A1 | 12/2017 | Beattie, Jr. |
| 2018/0027386 | A1 | 1/2018 | Zampini, II |
| 2018/0063482 | A1 | 3/2018 | Goesnar |
| 2018/0077592 | A1 | 3/2018 | Kim et al. |
| 2018/0091727 | A1 | 3/2018 | Pell et al. |
| 2018/0190279 | A1 | 7/2018 | Anderson et al. |
| 2019/0028758 | A1 | 1/2019 | Talvensaari et al. |
| 2019/0251362 | A1 | 8/2019 | Meisser et al. |
| 2020/0077045 | A1 | 3/2020 | Child et al. |

OTHER PUBLICATIONS

Dargazany, Aras, et al.—"Multibandwidth Kernel-Based Object Tracking," Advances in Artificial Intelligence, vol. 2010, Article ID 175603, 2010, Hindawi Publishing Corporation, 15 pages.
Edit on the fly. https://getmevo.com/mevoapp. Downloaded Dec. 12, 2016.
Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.
Embedded 10-site HD MCU with built-in 18x PTZ Video Conferencing Endpoint. http://www.averusa.com/video-collaboration/products/evc910.asp. 1991-2015.
Enable Face Detection. https://help.getmevo.com/hc/en-us/articles/224041827-Enable-Face-Detection. Sep. 27, 2016.
EVC Series. Meeting collaboration made easy and affordable. http://www.averusa.com/video-collaboration/products/evc-series-video-conferencing.asp. 1991-2015.
German Action, Application No. 10 2017 108 589.0 dated Apr. 18, 2018.
How to Cut to Different Shots. https://help.getmevo.com/hc/en-us/articles/223725908-How-to-Cut-to-Different-Shots. Sep. 27, 2016.
Oliva, Aude and Antonio Torralba, "Modeling the shape of the scene: a holistic representation of the spatial envelope," International Journal of ComputerVision, vol. 42(3): 145-175, 2001.
Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.
Plug-N-Play USB Video Conference Camera System for Mid to Large Rooms. http://www.averusa.com/video-collaboration/products/vc520-usb-conference-camera.asp. 1991-2015.
Portable USB Video Conference Camera System for Small and Huddle Rooms. 1991-2015. 10 pages.
Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible—open-source-beacon-fighter/.
Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.
Singh, Sanjay, et al.—"Real-time Object Tracking with Active PTZ Camera Using Hardware Acceleration Approach," I.J. Image, Graphics and Signal Processing, 2017, 2, 55-62, published online Feb. 2017 in MECS (http://www.mecs-press.org/.
So many ways to share. https://getmevo.com/sharing. Downloaded Dec. 12, 2016.
Tips for Having a Great Conference. Aver HD Video Conferencing. http://www.averusa.com/video-collaboration/support/video-conferencing-tips.asp. 1991-2015.
VC320. Portable USB Video Conferencing Camera System for Small and Huddle Rooms. 2016. 2 pages.
Wojciech Borowicz et al. "Building Apps in the Age of Beacons and Internet of Things", Mar. 11, 2015. https://uxmag.com/articles/building-apps-in-the-age-of-beacons-and-internet-of-things.
U.S. Appl. No. 16/543,397, McClintock et al.
U.S. Appl. No. 16/543,405, Atkins et al.
U.S. Appl. No. 16/543,411, Atkins et al.
U.S. Appl. No. 16/543,415, Atkins et al.
U.S. Appl. No. 16/833,854, Ostap et al.
U.S. Appl. No. 16/833,882, Ostap et al.
U.S. Appl. No. 16/833,908, Ostap et al.
Office Action dated Jun. 2, 2020 for U.S. Appl. No. 16/833,908.
Notice of Allowance and Fee(s) Due dated Sep. 9, 2020 for U.S. Appl. No. 16/833,908.
Office Action dated Jun. 15, 2020 for U.S. Appl. No. 16/833,882.
Office Action dated Jun. 18, 2020 for U.S. Appl. No. 16/833,854.

* cited by examiner

ADVANCED VIDEO CONFERENCING SYSTEMS AND METHODS

BACKGROUND

Field

Embodiments of the present disclosure generally relate to video conferencing systems.

Description of the Related Art

Video conferencing has become more popular in recent years, thanks in large part to the declining costs of electronic equipment associated therewith and the proliferation of high-speed Internet. Often, individuals or organizations who regularly use video conferencing will designate a specific conference room (or other physical space) to include technological resources dedicated solely to the task of video conferencing, thus providing a designated video conferencing environment.

Generally, designated video conferencing environments will include at least one camera positioned to capture a video stream of all or a portion of the designated conferencing environment and thus all or some of the video conference participants situated therein. More sophisticated video conferencing systems may be configured to detect activity in a video conferencing environment and adjust the boundaries of an image (field-of-view) displayed to a remote conference participant accordingly. For example, some video conferencing systems may be configured to detect an initial number of user participants within a larger physical space and automatically reframe the captured video stream (e.g., optically zoom in) around those participants to improve the viewing experience of remote conference participants. Typically, once a camera's field-of-view has been reframed about the initial conference participants using optical zoom, the camera is no longer useful for monitoring areas outside the of the framed space for changes in information. Thus, systems that are even more sophisticated may use a second camera to monitor the unframed spaces in the conference room for changes in information, such as new participants entering the room outside of the zoomed in field-of-view of the first camera. This new information may be used in directing the first camera to subsequently reframe (e.g., optically zoom out) to capture video stream of a larger area which includes those newly entered conference participants. Unfortunately, the cost, time, and technical complexity of such a two-camera system may be prohibitive to some potential users who otherwise desire the improved user experience of auto-framing and video conferencing system technology.

Accordingly, there is a need in the art for an advanced single camera video conferencing system, and video conferencing methods related thereto, that solves the problems described above.

SUMMARY

The present disclosure generally provides for advanced single camera video conferencing systems, and methods related thereto. The advanced single camera video conferencing systems typically feature a hybrid optical/digital camera, herein a camera device, having a controller that is configured to execute one or more of the methods set forth below.

In one embodiment, a video conferencing method using an advanced single camera video conferencing system is provided. The method includes using a camera device to define an actual field-of-view where the actual field-of-view optically frames a first portion of a video conferencing environment. The method further includes using the same camera device to digitally frame and stream a second portion of the video conferencing environment to provide an apparent field-of-view. Typically the same image sensor of the same camera device is used to frame the actual field-of-view and the apparent field-of-view. The apparent field-of-view is generally acquired from only a portion of the actual field-of-view of the image sensor. Thus, the apparent field-of-view will be encompassed within the actual field-of-view and an excluded region will be encompassed within a portion of the actual field-of-view which is outside of the boundaries of the apparent field-of-view. The video conferencing method further includes generating a video stream of the apparent field-of-view. In some embodiments, generating a video stream of the apparent field-of-view includes acquiring video data from the portion of the actual field-of-view of the image sensor that defines the boundaries of the apparent field-of-view and not acquiring video data from the excluded region. Acquiring video data from only the portion of the actual field-of-view of the image sensor that defines the boundaries of the apparent field-of-view beneficially facilitates seamless integration of the method with readily available video conferencing software applications, such as Microsoft® Skype®, Apple® FaceTime® and applications available from Zoom® Video Communications, Inc. Here, the video conferencing method further includes generating a plurality of survey frames of the actual field-of-view and analyzing the plurality of survey frames to generate survey data. The survey data may be used to detect changes within the first portion of the video conferencing environment over time.

Embodiments of the present disclosure may further provide a method of monitoring a video conferencing environment using an advanced single camera video conferencing system. The method includes framing a first portion of a video conferencing environment to provide an actual of view, generating a video stream of an apparent field-of-view encompassed within the actual field-of-view, and transmitting the video stream of the apparent field-of-view to a video conferencing software application which is being executed on a user device. The method further includes periodically generating one or more frames of the actual field-of-view, extracting the one or more frames of the actual field-of-view from the video stream before the video stream is transmitted to the video conferencing application, and analyzing the one or more periodically generated frames of the actual field-of-view to generate survey data. Here, the video stream includes one or more pluralities of sequentially generated frames of the apparent field-of-view. The respective frames of the actual field-of-view and video stream of the apparent field-of-view are both generated using the same camera device. In some embodiments, the respective frames of the actual field-of-view and the video stream of the apparent field-of-view are both generated using the same image sensor of the same camera device.

Embodiments of the present disclosure may further provide a method of framing a portion of video conferencing environment to provide a desired apparent field-of-view while maintaining a desired threshold image resolution of a video stream. The method allows for video streaming of a desired apparent field-of-view and concurrent monitoring of the video conferencing environment in portions excluded from the desired apparent field-of-view using an advanced single camera video conferencing system. The method includes optically framing a portion of a video conferencing environment to provide an actual field-of-view, determining a desired threshold image resolution of a to-be-transmitted video stream of a desired apparent field-of-view, digitally zooming up to a desired threshold image resolution to provide a digitally zoomed image, and comparing the digitally zoomed image to the desired apparent field-of-view to determine a difference therebetween. In some embodiments, the method further includes optically zooming the camera device based on the difference between the digitally zoomed image and the desired apparent field-of-view to provide the desired apparent field-of-view at the desired resolution. In some embodiments, the desired threshold image resolution is derived from a dynamically changing bandwidth that is available for transmitting the video stream. Typically the same image sensor of the same camera device is used to frame both the actual field-of-view and the apparent field-of-view where the apparent field-of-view is acquired from only a portion of the actual field-of-view detected by the image sensor. Thus, the apparent field-of-view will be encompassed within the actual field-of-view and an excluded region will be encompassed within a portion of the actual field-of-view which is outside of the boundaries of the apparent field-of-view.

Embodiments of the present disclosure may further provide a video conferencing method, comprising defining, by use of a camera device, a first actual field-of-view, wherein the first actual field-of-view optically frames a first portion of a video conferencing environment, digitally framing, by use of the camera device, a second portion of the video conferencing environment to provide a first apparent field-of-view, wherein the first apparent field-of-view is encompassed within the first actual field-of-view, generating, by use of the camera device, a video stream of the first apparent field-of-view, generating, by use of the camera device, survey data comprising a plurality of survey frames that each comprises at least a portion of the first actual field-of-view that is different from the first apparent field-of-view, and detecting changes in the survey data over time. The process of digitally framing the second portion of the video conferencing environment to provide the first apparent field-of-view may include determining a desired threshold image resolution of a to-be-transmitted video stream of the first apparent field-of-view, digitally zooming, using the camera device, up to the desired threshold image resolution to provide a digitally zoomed image, comparing the digitally zoomed image and the first apparent field-of-view to determine a difference therebetween, and based on the difference between the digitally zoomed image and the first apparent field-of-view, optically zooming to the first apparent field-of-view. The desired threshold image resolution may be determined by a display resolution of a system that is configured to receive the to-be-transmitted video stream at a remote location or by a dynamically changing bandwidth which may be used to transmit the video stream.

Embodiments of the present disclosure may further provide a method of monitoring a video conferencing environment, comprising optically framing, by use of a camera device, a first portion of a video conferencing environment to provide a first actual field-of-view, generating, by use of the camera device, a video stream of a first apparent field-of-view, wherein the first apparent field-of-view is encompassed within the first actual field-of-view, and the video stream comprises one or more pluralities of sequentially acquired frames of the first apparent field-of-view, transmitting the video stream of the first apparent field-of-view to a user device that includes a video conferencing software application stored in memory, periodically interrupting the video stream of the first apparent field-of-view to generate, using the camera device, one or more survey frames that comprise at least a portion of the first actual field-of-view that is different from the first apparent field-of-view, extracting the one or more survey frames from the video stream before the video stream is transmitted to the user device, and storing the one or more survey frames captured during each of the periodic interruptions as survey data.

Embodiments of the present disclosure may further provide a video conferencing method, comprising optically framing, by use of a camera device, a portion of a video conferencing environment to provide a first actual field-of-view, determining a desired threshold image resolution of a to-be-transmitted video stream of a desired apparent field-of-view, digitally zooming, by use of the camera device, up to a desired threshold image resolution to provide a digitally zoomed image, comparing the digitally zoomed image to the desired apparent field-of-view to determine a difference therebetween, and based on the difference between the digitally zoomed image and the desired apparent field-of-view, optically zooming, by use of the camera device, to the desired apparent field-of-view.

Embodiments of the present disclosure may further provide video conferencing system comprising a camera device and a non-transitory computer readable medium. The camera device comprises an image sensor and a lens, wherein one or both of the lens and the image sensor are movable with respect to the other to change a focal length of the camera device. The non-transitory computer readable medium includes instructions which when executed by a processor are configured to cause the video conferencing system to perform a method comprising optically framing a first portion of a video conferencing environment to provide a first actual field-of-view, digitally framing a second portion of the video conferencing environment to provide a first apparent field-of-view, wherein the first apparent field-of-view is encompassed within the first actual field-of-view, and generating a video stream of the first apparent field-of-view. In some embodiments, the camera device comprises a processor for executing the method and the non-transitory computer readable medium having instructions for the method stored thereon. In other embodiments, the processor for executing the method and/or the non-transitory computer readable medium are comprised in a user device in communication with the camera device.

Embodiments of this disclosure may further provide a computer implemented method for preventing undesired and frequent adjustments to the boundaries of a video stream of a physical environment based on relatively minor detected changes therein. The method includes generating a crop-failure score for a current apparent field-of-view, comparing the crop-failure score or an accumulated crop-failure score to a crop-failure tolerance limit, determining boundaries of a desired apparent field-of-view, and altering the video stream when the crop-failure score or the accumulated crop-failure score is equal to or outside of the crop-failure tolerance limit. Here, the crop-failure score is based on a location of one or more participants in a portion of a physical environment relative to the boundaries of the current apparent field-of-view of a camera device. The accumulated crop-failure score generally comprises a plurality of generated crop-failure scores. The boundaries of a desired apparent field-of-view are based on the locations of the one or more participants in the portion of the physical environment.

In some embodiments, the portion of the physical environment is defined by an actual field-of-view of a camera device.

Embodiments of this disclosure may further provide a computer implemented method for adjusting the boundaries of a video stream of a physical environment based on detected changes therein. The method facilitates alterations to the video stream to improve the viewing experience of a remote user by reframing an apparent field-of-view of the video stream for significant events while concurrently preventing frequent and undesirable adjustments to the apparent field-of-view that might cause physical discomfort, such as motion related sickness, for the remote viewer. The method includes generating a crop-failure score for a current apparent field-of-view of a video stream generated by a camera device, comparing the generated crop-failure score or an accumulated crop-failure score to a crop-failure tolerance limit, and determining when to adjust the crop of the apparent field-of-view. Generally determining when to adjust the crop of the apparent field-of-view includes determining the boundaries of a desired apparent field-of-view of a video stream when the generated crop-failure score is equal to or outside of the crop-failure tolerance limit. In some embodiments, the method further includes determining a difference between at least one attribute of the desired apparent field-of-view with the current apparent field-of-view and comparing the determined difference between the at least one attribute of the desired apparent field-of-view with the current apparent field-of-view with an anti-movement rule. The method further includes determining that an alteration to the video stream generated by the camera device is required based on the comparison of the determined difference between the at least one attribute of the desired apparent field-of-view and the at least one attribute of the current apparent field-of-view with the anti-movement rule and, if so required, altering the video stream generated by the camera device to change from the current apparent field-of-view to the desired apparent field-of-view. Here, the generated crop-failure score is based on a location of one or more participants relative to the one or more boundaries of the current apparent field-of-view of a video stream generated by a camera device. Typically, the accumulated crop-failure score comprises a plurality of generated crop-failure scores.

Embodiments of the present disclosure may further provide a video streaming system which may be used to both monitor a physical environment to detect changes therein and provide a video stream of a portion of the physical environment to-be-transmitted to a remote viewer. Here, the video streaming system includes a software application which when executed by a processor prevents undesired and frequent adjustments to the boundaries of the video stream of the physical environment based on relatively minor detected changes therein. The video streaming system includes a camera device and a non-transitory computer readable medium that includes instructions which when executed by a processor are configured to cause the video streaming system to perform a method. Generally, the camera device features an image sensor and a lens, where one or both of the lens and the image sensor are movable with respect to the other to change a focal length of the camera device and thus define an actual field-of-view of the physical environment. The method includes generating a crop-failure score for a current apparent field-of-view, comparing the crop-failure score or an accumulated crop-failure score to a crop-failure tolerance limit, and determining when to reframe the current apparent field-of-view. Determining when to reframe the current apparent field-of-view includes determining boundaries of a desired apparent field-of-view and altering the video stream when the crop-failure score or the accumulated crop-failure score is equal to or outside of the crop-failure tolerance limit. Here, the crop-failure score is based on a location of one or more participants in a portion of a physical environment relative to the boundaries of the current apparent field-of-view of a camera device. The accumulated crop-failure score generally comprises a plurality of generated crop-failure scores. The boundaries of a desired apparent field-of-view are based on the locations of the one or more participants in the portion of the physical environment. In some embodiments, the portion of the physical environment is defined by an actual field-of-view of the camera device. In some embodiments, the camera device comprises a processor for executing the method and the non-transitory computer readable medium having instructions for the method stored thereon. In other embodiments, the processor for executing the method and/or the non-transitory computer readable medium are comprised in a user device in communication with the camera device.

Embodiments of the present disclosure may further provide a video streaming system comprising a camera device, a non-transitory computer readable medium, and a processor. The camera device features an image sensor and a lens, wherein one or both of the lens and the image sensor are movable with respect to the other to change a focal length of the camera device and thus define an actual field-of-view of a physical environment. The non-transitory computer readable medium includes instructions which when executed by the processor are configured to cause the video streaming system to perform a method. The method includes determining an actual composition of an apparent field-of-view of a to-be-transmitted video stream and comparing the actual composition of the apparent field-of-view to one or more composition rules. Typically, the actual composition comprises a location of one or more participants relative to one or more boundaries of the apparent field-of-view. The one or more composition rules may be based on general principles of photography. For example, the one or more composition rules may be based on one or a combination of negative space surrounding the one or more participants, negative space between the one or more participants and a boundary of the apparent field-of-view, asymmetry of the location of the one or more participants within the apparent field-of-view, a direction one or more participants are facing within the apparent field-of-view, a depth of field between at least two participants, a depth and/or width of the physical environment relative to the camera device, and a size, location, and/or type of one or more objects within the physical environment which are not participants. The method further includes determining a desired composition of the apparent field-of-view, determining that the desired composition is different from the actual composition, and based on a difference between the actual composition and the desired composition, or on an accumulation of differences between the desired composition and the actual composition, altering the to-be-transmitted video stream. Here, altering the to-be-transmitted video stream includes changing the boundaries of the apparent field-of-view to provide the desired composition. In some embodiments, the camera device comprises a processor for executing the method and the non-transitory computer readable medium having instructions for the method stored thereon. In other embodiments, the processor for executing the method and/or the non-transitory computer readable medium are comprised in a user device in communication with the camera device.

Embodiments of this disclosure may further provide a video conferencing method. The method includes generating a video stream of a current apparent field-of-view of a video conferencing environment, determining the boundaries of a desired apparent field-of-view of the video stream, determining a difference between at least one attribute of the desired apparent field-of-view with the current apparent field-of-view, and comparing the determined difference between the at least one attribute of the desired apparent field-of-view with the current apparent field-of-view with an anti-movement rule. The method further includes determining whether an alteration to the video stream generated by the camera device is required based on the comparison of the determined difference between the at least one attribute of the desired apparent field-of-view and the at least one attribute of the current apparent field-of-view with the anti-movement rule and, if so required, altering the video stream generated by the camera device to change from the current apparent field-of-view to the desired apparent field-of-view.

Embodiments of this disclosure may further provide a computer implemented method for monitoring the composition of a video stream of a physical environment. The method includes generating a video stream of an apparent field-of-view of a physical environment, generating one or more survey frames of at least a portion of an actual field-of-view of the physical environment least, and analyzing the one or more survey frames to generate survey data. Here, the video stream of the apparent field-of-view and the actual field-of-view are generated using the same camera device. Typically, generating the video stream of the apparent field-of-view includes analyzing the apparent field-of-view to determine an actual composition thereof, and comparing the actual composition to one or more composition rules to determine when to alter the video stream. Determining when to alter the video stream includes analyzing the survey data using the one or more composition rules, and altering the apparent field-of-view based on a difference between the actual composition and the desired composition. Generally, altering the apparent field-of-view includes one or a combination of panning, tilting, optically zooming, and digitally zooming the camera device.

Embodiments of this disclosure may further provide a video conferencing method for monitoring the composition of a video stream of a video conferencing environment, according to one embodiment. The method includes defining an actual field-of-view of the video conferencing environment, generating one or more survey frames that comprise at least a portion of the actual field-of-view, analyzing the one or more survey frames to generate survey data, generating a crop-failure score using the survey data, and altering the apparent field-of-view when the crop-failure score or an accumulated crop-failure score is equal to or outside of a crop-failure tolerance limit. Here, the crop-failure score is based on a location of one or more participants relative to one or more boundaries of an apparent field-of-view contained within a first video stream generated by the camera device, and wherein the apparent field-of-view is different from the actual field-of-view.

Embodiments of this disclosure may further provide a computer implemented method for monitoring the composition of a video stream of a physical environment and making adjustment thereto. The method desirably prevents frequent and undesirable adjustments to the video stream that might cause physical discomfort, such as motion related sickness, for the remote viewer. The method includes generating a video stream of an apparent field-of-view of a physical environment, generating one or more survey frames of at least a portion of an actual field-of-view of the physical environment least, and analyzing the one or more survey frames to generate survey data. Here, the video stream of the apparent field-of-view and the actual field-of-view are generated using the same camera device. Typically, generating the video stream includes analyzing the apparent field-of-view to determine an actual composition thereof, and analyzing the one or more survey frames or survey data to determine a desired composition of the apparent field-of-view. The method further includes determining a difference between one or more attributes of the actual composition and one or more attributed of the desired composition and comparing the difference to an anti-movement rule. The method further includes determining whether an adjustment to the apparent field-of-view should be made based on the comparison and altering the apparent field-of-view based on the determination. Altering the apparent field-of-view generally includes changing the boundaries of the apparent field-of-view to provide the desired composition.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
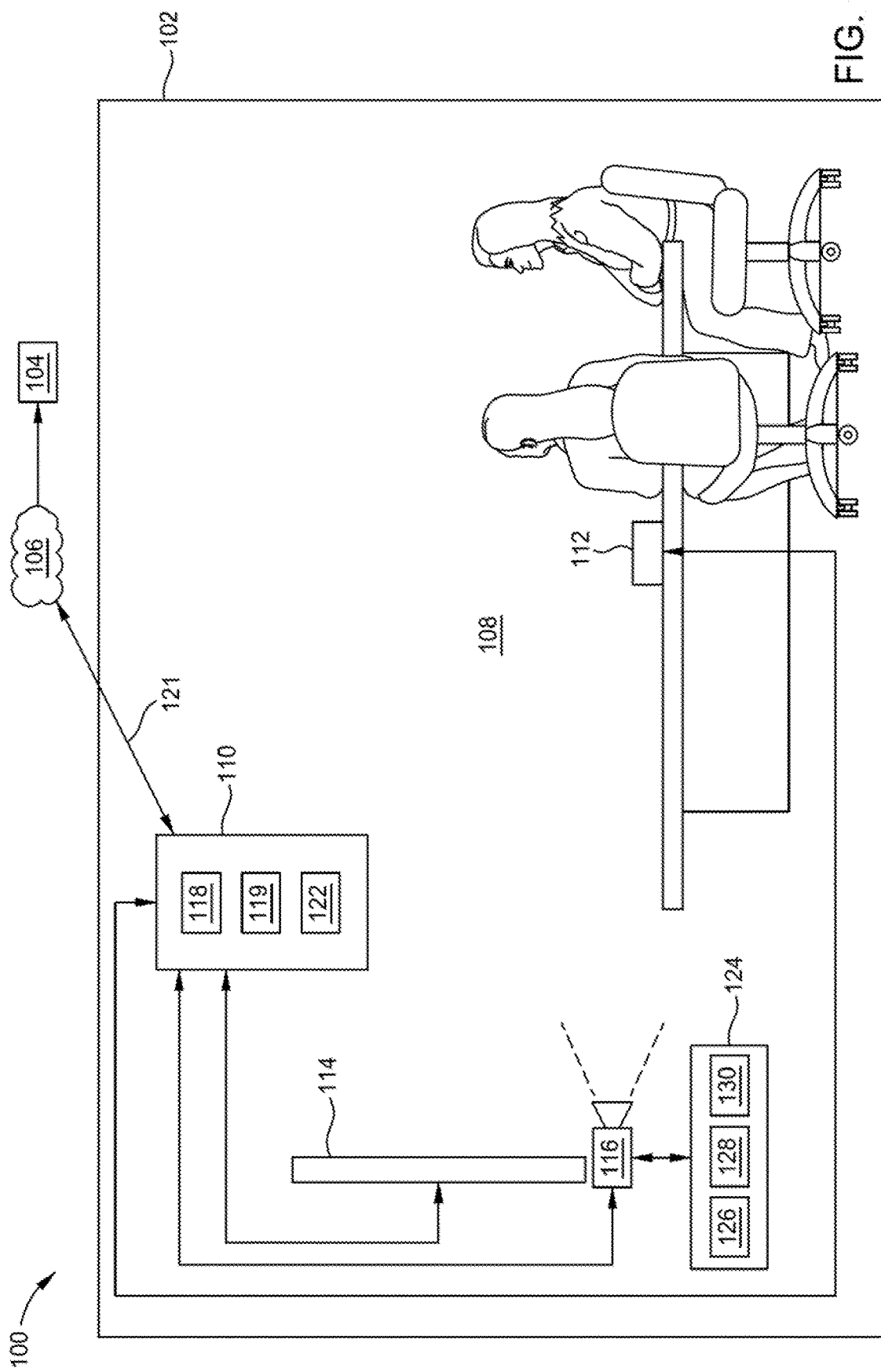
FIG. 1 is a schematic representation of an exemplary video conferencing system, according to one embodiment.

Organizations of every kind have embraced video conferencing technology to fulfill at least a portion of their communication needs. As the proliferation of video conferencing systems increases so do user expectations related to the essential video and/or audio content exchanged between video conferencing sites, equipment cost, and usability. Thus, embodiments herein provide systems and software implemented methods that are configured to provide desired video conference content that is delivered at a lower cost compared to existing systems, and configured for seamless integration with readily available video conferencing software applications, such as Microsoft® Skype®, Apple® FaceTime® and applications available from Zoom® Video Communications, Inc. Some embodiments provided herein include systems and software that enable advanced auto-framing methods to be used during a video conference.

In one example, embodiments herein provide for digitally framing a portion of a video conferencing environment, such as about one or more initial or early arriving conference participants, to provide an apparent field-of-view used for a video data stream to-be-transmitted to a remote video conferencing endpoint. Concurrent therewith, embodiments herein provide for monitoring other areas of the video conferencing environment for changes that occur outside of the apparent field-of-view, such as late arriving conferencing participants. In some embodiments, the camera device used for automatically framing, generating, and transmitting the first apparent of view is the same camera device used to concurrently monitor the areas outside of the apparent field-of-view, thus providing an advanced single camera video conferencing system. As used herein, "advanced single camera video conferencing system" refers to a video conferencing system featuring a single camera device used for both framing the first apparent of view and monitoring areas outside of the apparent field-of-view. Use of the term "advanced single camera video conferencing system" is not meant to limit the use of other cameras with the video conferencing system for other purposes. Nor does the term limit the use of multiple advanced single camera video conferencing systems within the same designated physical space or to be used at the same time.

In some embodiments, the single camera device or system used with the methods set forth herein is a hybrid optical/digital camera capable of both optically zooming and digitally zooming. Optical zooming typically includes adjusting the focal length of a camera lens ("optical zoom lens") where the focal length is the distance between the center of the optical zoom lens and an image sensor of the camera device. When the focal length is increased, i.e., the optical zoom lens is moved farther from the image sensor (or vice versa), a smaller portion of the desired scene strikes the image sensor resulting in magnification of the scene. The focal length also determines an actual field-of-view (also known as angle of view) that may be captured by the image sensor within the camera device. As the focal length is increased to optically zoom-in on a desired scene, the "actual field-of-view" of the camera narrows, thus optically cropping the periphery of the desired scene, and making objects therein seem closer. Thus, after performing an optical zoom, which may include either zooming-in or zooming-out, will create a new field-of-view (e.g., the smaller portion of the desired scene in a zooming-in case), which is then transmitted in a signal generated by the image sensor to a controller for processing and eventual delivery to one or more electronic components or devices. Optical zoom is generally considered lossless from a resolution point-of-view, meaning that the quality of the resulting optically zoomed image is the same as if the camera device had been moved closer to the desired scene.

A digitally zoomed image is typically made up of limited amount of data captured using a portion of the image sensor of the camera device. The limited amount of data is used to provide an image of an "apparent field-of-view." The limited amount of data does not include data that might be otherwise acquired from the portions of image sensor that are outside of, and thus excluded by, the apparent field-of-view. The amount of data may be limited simultaneously with the acquisition thereof, e.g., by only acquiring video data from the portion of the image sensor corresponding to the desired apparent field-of-view, or the data may be reduced using a post-processing digital zoom software application. Post-processing digital zoom typically uses a software algorithm to decrease a larger amount of data acquired from the "actual field-of-view" of the image sensor, such as by cropping an image captured by the image sensor from the actual field-of-view down to an area with the same aspect ratio as the original. Thus, digital zoom may be done simultaneously with the acquisition of the video data, by not including in the acquisition the undesired data from excluded regions of the image sensor, or may be done post processing after an original image, such as the actual field-of-view has been acquired by the image sensor. With either method, digital zoom effectively enlarges a scene to make it seem like the viewer is closer to the subject.

To compensate for the loss of resolution caused by enlarging an image, digital zoom of either method, may or may not use image interpolation to appear to increase the number of pixels used to form the digitally zoomed image to those of the original image. Unfortunately, whether or not image interpolation is used, digital zoom is not lossless from a resolution point-of-view, meaning that the image quality deteriorates as the image is enlarged and an unmodified digitally zoomed image may appear undesirably pixelated (e.g., without image interpolation) or undesirably blurry or smudgy (e.g., with image interpolation) when compared to the non-zoomed image or an image that has been captured using optical zoom. Thus, optical zoom is generally considered to provide superior image quality over an image created via a digital zoom.

Typically, those skilled in the art will prioritize optical zoom over digital zoom due to the relative image quality losses associated with the use of a digital zoom. Often this means that optical zoom will be used to the maximum extent possible towards achieving a desired image magnification before digital zoom is used to achieve additional image magnification if additional magnification is so desired. Nonetheless, in at least some of the video conferencing systems and methods described herein, digital zoom is counterintuitively prioritized over optical zoom at least to some extent. This means that digital zoom is used to crop and thus enlarge the desired scene, for example by framing an apparent field-of-view about a number of initial participants, before switching to an optical zoom to maintain a desired minimum video image quality. Prioritizing digital zoom over optical zoom enables at least some of the methods set forth herein, such as by facilitating monitoring of a designated physical conference space outside of a framed video stream provided to a remote viewer using the same camera device as is used to capture the framed video stream. Such advanced single camera video conferencing systems, and methods related thereto, are further provided in the descriptions of the figures below.

FIG. 1 is a schematic representation of an exemplary video conferencing system 100, according to one embodiment, which may be used to implement the methods set forth herein. Here, the video conferencing system 100 includes a first video conferencing endpoint 102, one or more remote video conferencing endpoints, such as the second video conferencing endpoint 104, and a network 106 that facilitates communication there between. The network 106 generally represents any data communications network suitable for the transmission of video and audio data (e.g., the Internet). A communication link 121 is used to support the transmission of video conference feeds that include audio and video streams between the first video conferencing endpoint 102, the network 106 and/or the second video conferencing endpoint 104. The communication link 121 may be formed on a network that is connected to a Local Area Network (LAN) present in each video conference location and/or across multiple video conference locations on a Wide Area Network (WAN). In one configuration, the communication link 121 utilizes a wired or wireless communication technique to transmit data between the video conferencing locations. Wireless communication techniques can include, but are not limited to a cellular phone network, WiFi network, satellite communication network or other useful wireless communication technique. Wired communication techniques may include, but are not limited to fiber, cable or DSL type data transmission methods/technologies. In general, the second video conferencing endpoint 104 will include one or more systems that are able to receive, process and/or display the information transmitted from the first video conferencing endpoint 102 via the communication link 121, and may include, but is not limited to a laptop, personal computer, tablet, smart phone, or other similar electronic device.

The first video conferencing endpoint 102 features a designated physical space, such as the video conferencing environment 108, shown here as a conference room, having designated video conferencing equipment disposed therein. Here, the designated video conferencing equipment includes a user device 110, a microphone 112, a display 114, and a camera device 116.

Generally, the user device 110 represents any computing device capable of transmitting a video stream to a remote video conferencing device (e.g., the second video conferencing endpoint 104) over via the communication link 121 to the network 106. Examples of computing devices suitable for use as the user device 110 include, without limitation, laptops, personal computers, tablets, and smart phones. A processor 119 (e.g., CPU) within the user device 110 is used to execute one or more video conferencing software applications 118 capable of transmitting data (e.g., video data) received from the camera device 116 to the second video conferencing endpoint 104 via the communication link 121, and receiving video data from the second video conferencing endpoint 104, via the communication link 121. Examples of such video conferencing software applications, which may be used as the software application 118, include, without limitation, Microsoft® Skype®, Apple® FaceTime®, and applications available from Zoom® Video Communications, Inc. More generally, however, any video conferencing software application capable of receiving video data and transmitting the video data to a remote site can be used, consistent with the functionality described herein. In some embodiments, the user device 110 may be used to display video data captured at and received from the second video conferencing endpoint 104, on the display 114 (e.g., LED television, OLED television, plasma display). In some embodiments, the user device 110 (e.g., a laptop or tablet) be used to display video data captured at and received from the second video conferencing endpoint 104 on a native display of the user device 110. In some embodiments, the user device 110 is configured to execute on or more artificial intelligence (AI) applications 122 which may be used to perform aspects of the methods set forth herein.

In some embodiments, the video conferencing environment further includes a controller 124 disposed in wireless or wired communication with the camera device 116. The controller 124 may comprise any computing device capable of performing any one or combination of the same functions as are described below with respect to the controller 206 of the camera device 200. Examples of computing devices suitable for use as the controller 124 include, without limitation, laptops, personal computers, tablets, and smart phones. Here, the controller 124 includes a processor 126, a memory 128, and support devices 130. The processor 126 may be the same or substantially similar to the processor 212 as is described below for FIG. 2 and may include any one or combination of the features thereof. The memory 128 may be the same or substantially similar to the memory 214 as is described below for FIG. 2 and may include any one or combination of the features thereof, including the operating system 222, one or more software applications 224, environment structure 226, survey data 228, a crop-failure score generator 230, crop-failure data 232, one or more anti-movement rules 234, and/or one or more composition rules 236 stored therein. The support devices 130 may be the same or substantially similar to any one or combination of the I/O device 216, video streaming device 218, and/or communications device as are described below for FIG. 2. It is contemplated that any one of, or combination of, the methods set forth herein and described as being performed by the camera device 200 may also be performed by the combination of the camera device 116 and the controller 124 communicatively coupled thereto.

Figure 2:
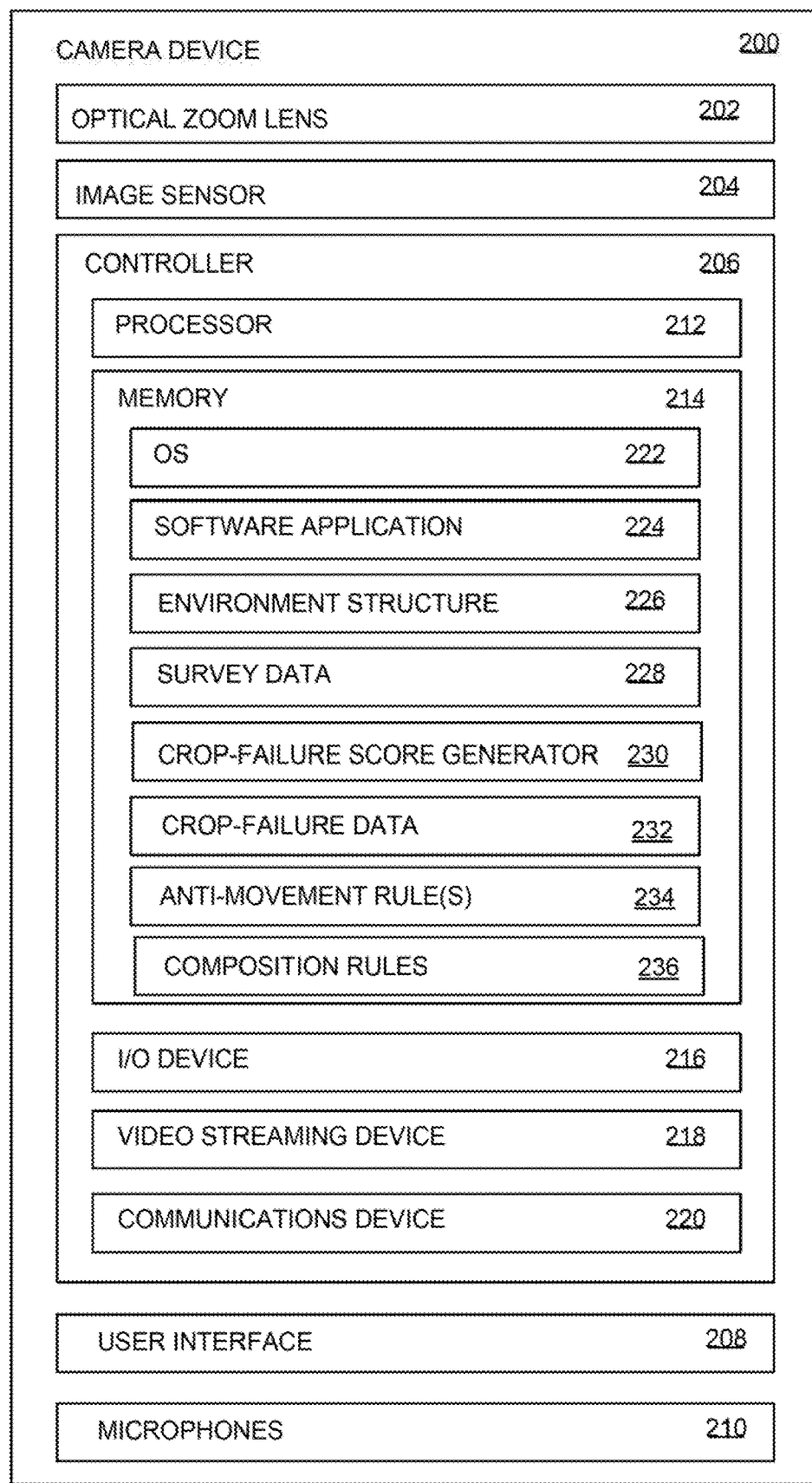
FIG. 2 is a schematic representation of various components that may be contained within a camera device that may be used with the conferencing system of FIG. 1, according to one embodiment.

FIG. 2 is a schematic representation of a hybrid optical/digital camera, here the camera device 200, which may be used in place of or be contained within the camera device 116 of FIG. 1. The camera device 200 features a wide field-of-view (wFOV) capable of view angles in the range of about 70 degrees to about 180 degrees and an optical zoom from about 1.2× or more, such as about 1.4× or more, about 1.6× or more, about 1.8× or more, or 2× or more. Here, the camera device 200 includes an optical zoom lens 202, an image sensor 204, and a controller 206. Here, one or both of the optical zoom lens 202 and the image sensor 204 are movable with respect to the other by use of an optical zoom controller (not shown) within the camera device 200 to allow for changes in the focal length and thus provide an optical zoom feature of the camera device 200. In some embodiments, the camera device 200 is a pan and tilt hybrid optical/digital camera device configured to adjust the orientation of the optical components, such as the optical zoom lens 202 and image sensor 204 across multiple degrees of freedom. In some embodiments, the camera device 200 further includes a user interface 208, e.g., a remote control, disposed in wired or wireless communication (e.g., WiFi, Bluetooth®) with the controller 206, and/or one or more microphones 210. The remote user interface 208 may be used by a user during installation and set-up of the camera device 200 and/or to manually override at least some of the methods set forth herein when manual control over the camera device 200 is so desired.

As shown in FIG. 2, the controller 206 is an electronic device that includes a processor 212, memory 214, input/output (I/O) devices 216, a video streaming device 218, and a communications device 220. The processor 212 may be any one or combination of a programmable central processing unit (CPU), a graphics processing unit (GPU), a digital signal processor (DSP), a programmable gate array (FPGA), an application-specific integrated circuit (ASIC), or other hardware implementation(s) suitable for performing the methods set forth herein, or portions thereof.

Herein, the memory 214, coupled to the processor 212, is non-transitory and represents any non-volatile type of memory of a size suitable for storing one or a combination of an operating system 222, one or more software applications 224, an environment structure 226, survey data 228, a crop-failure score generator 230, and an anti-movement rule 234. Examples of suitable memory that may be used as the memory 214 include readily available memory devices, such as random access memory (RAM), flash memory, a hard disk, or a combination of different hardware devices configured to store data. In some embodiments, the memory 214 includes memory devices external to the controller 206 and in communication therewith. In some embodiments, at least one of the one or more software applications 224 are executable by the processor 212 to perform one or more or combinations of the methods set forth herein which advantageously simplifies integration with generally available video conferencing software applications 118. In other embodiments, one or more or combinations of the methods may be executed by one of a general-purpose computer or a custom electronic device external to the camera device 200 and in wired or wireless communication therewith. In some embodiments, the one or more software applications 224 stored in memory 214 include instructions which when executed by the processor 212 are configured to perform one or more of the methods described herein, such as at least a portion of the methods illustrated in and discussed in relation to FIGS. 3-7 below.

The video streaming device 218 is coupled to the processor 212 and is generally used to encode video data acquired from the image sensor 204 in a desired encoding format and at a desired bitrate. Generally, bitrate describes how much video data a video stream contains where higher resolution, higher frame rates, and lower compression requires an increased bitrate. In some embodiments, the video streaming device 218 and one or more of software applications 224 executed by the processor 212 collectively function as a digital zoom feature of the camera device 200. In those embodiments, the video streaming device 218 is used to increase or decrease the apparent field-of-view of a video data stream acquired by the image sensor, i.e., digitally zoom-in to capture video data of only a portion of the actual field-of-view acquired by the image sensor. The digitally zoomed video data is typically transmitted to a user device, such as the user device 110 of FIG. 1, using the communications device 220 as further described below. In some embodiments, the digital zoom feature of the camera device 200 is configured to intermittently capture and transmit one or more non-digitally zoomed frames, i.e., one or more frames comprising the actual field-of-view acquired by the image sensor. Typically, the intermittently capture frame(s) are analyzed using the one or more software applications 224 to generate survey data 228 which may be stored in a memory 214 of the controller 206 and/or used by the processor 212 for further analysis using one or a combination of the methods set forth herein.

The communications device 220, communicatively coupled to the video streaming device 218, delivers the encoded video data to a user device, such as the user device 110 of FIG. 1, using a wireless connection, such as WiFi or Bluetooth®, or a wired connection, such as an Ethernet or USB connection. In some embodiments described herein, the user device 110 then transmits the video data to a remote video conferencing endpoint, such as the second video conferencing endpoint 104, using the video conferencing software application 118. Typically, the desired encoding format, bit rates, and/or frame rates of the to-be-transmitted video data are established between the controller 210 and the video conferencing software application 118 of the user device 110 before full communication begins there between, e.g., by a handshake protocol.

In other embodiments, which may be combined in any one of, combinations of, or combinations of portions of the methods set forth herein, video data is transmitted to a remote video conferencing endpoint(s) using conventional communication devices and protocols. For example, the video data may be transmitted to a remote video conferencing endpoint using a network interface card, Ethernet card, modem, wireless network hardware and/or other conventional computing device communication hardware.

Figure 3:
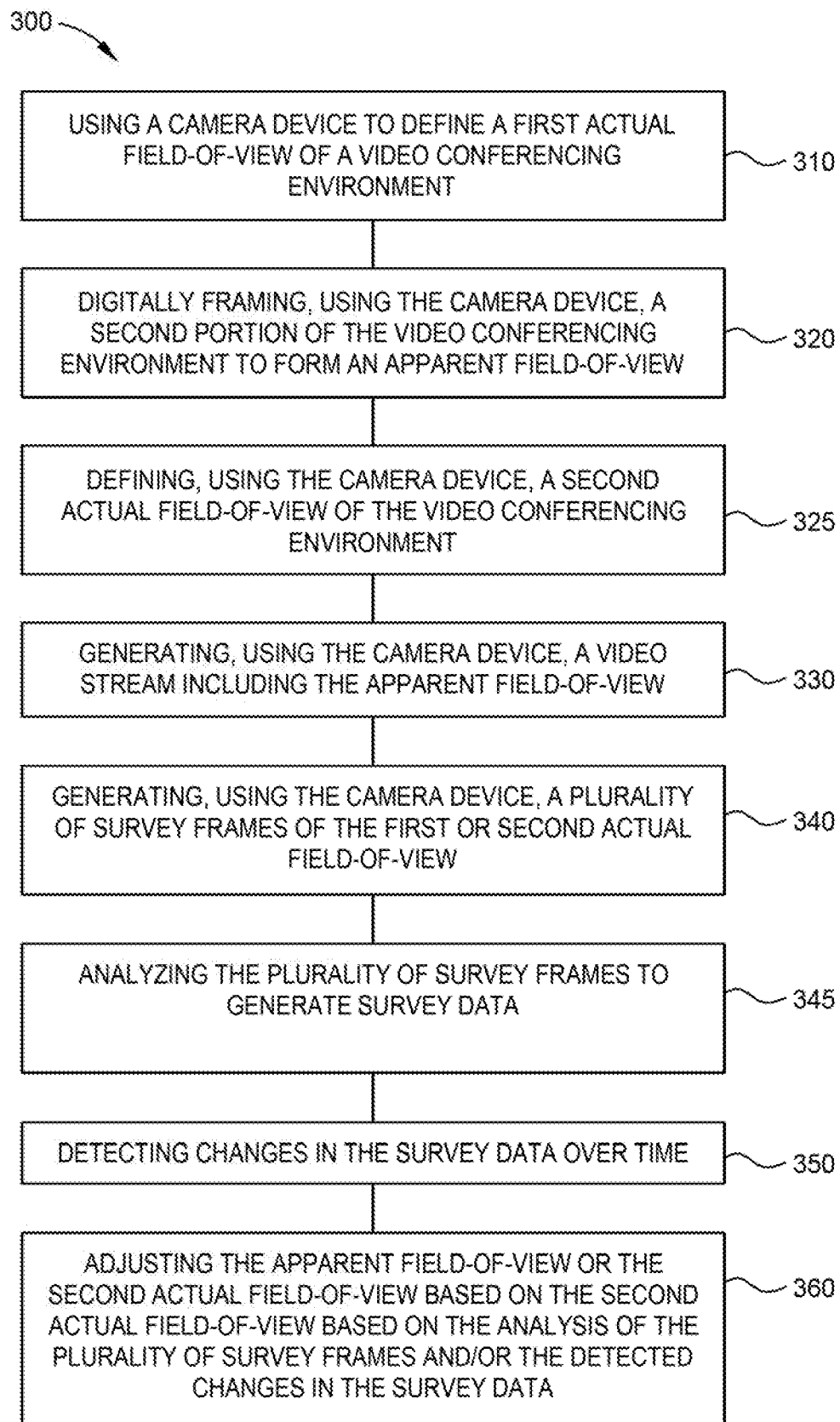
FIG. 3 is a diagram illustrating a video conferencing method, according to one embodiment.

FIG. 3 is a diagram illustrating a video conferencing method 300, according to one embodiment, which may be performed using the video conferencing system 100 and/or camera device 200 of FIGS. 1 and 2 respectively. FIGS. 4A-4I are schematic views of a video conferencing environment 400 (at different moments in time) that are used herein to illustrate various aspects of the video conferencing method 300. The video conferencing environment 400 may be similar to the video conferencing environment 108 of the video conferencing system 100 in FIG. 1 and may include and/or be combined with any one, all, or combination of the features described therein.

At activity 310 the method 300 includes using a camera device, such as the camera device 116 or 200 of FIG. 1 or 2, to define a first actual field-of-view 408 (FIG. 4B), where the first actual field-of-view 408 is an optically framed portion of a video conferencing environment 400. The first actual field-of-view 408 is thus a first portion 402 of the video conferencing environment 400. In some embodiments, activity 310 of the method 300 includes optically framing the first portion 402 (shown in FIG. 4A) of the video conferencing environment 400 using the camera device 200. In some embodiments, optically framing the first portion 402 of the video conferencing environment 400 includes initializing the camera device 200. Initializing the camera device 200 may include any one or combination of automatically panning, tilting, and optically zooming the camera device 200 to frame the first portion 402 according to initialization settings stored in the memory 214 of the camera device 200 as an environment structure 226. In some embodiments, the initialization settings are established by a user, such as in information technology professional, during installation of the camera device 200 in the video conferencing environment 400, and thus prior to the video conferencing session.

Examples of considerations in setting the frame boundaries to define the first portion 402 may include, without limitation, room dimensions, seating area locations, and/or the location of presentation aids, such as a white board. In some embodiments, the customized view (i.e., conference room framed view) may account for designated points of interest, such as the door 404, where it may be desirable to monitor the scene for activity, such as monitoring the door 404 for the entrance of new participants. In some embodiments, the customized view may account for designated points of distraction, such as the window 406 (FIG. 4A), where it may be desirable to set the frame boundaries to exclude potential distracting activity. Setting the frame boundaries of the first portion 402 may be done manually by a user, such as an IT professional, and/or may be facilitated by a set-up program contained within one or more software applications 224 in the memory 214 of the camera device 200.

In some embodiments, the considerations described above, such as room dimensions, seating locations, locations of presentation aids, points of interest, such as the door 404, and points of distraction, such as the window 406, are stored in the memory 214 of the camera device 200 as the environment structure 226. In some embodiments, the initial frame boundaries that define the first portion 402 are manually set by a user at the beginning of a video conferencing session and thus override the initialization settings stored in the memory 214 of the camera device 200.

In some embodiments, activity 310 of the method 300 further includes capturing initial survey frames, e.g., one or more images, or a portion of a video data stream, having the framed boundaries that define the first portion 402 and performing an analysis on the initial survey frames to generate initial survey data. In some embodiments, performing an analysis on the initial survey frames to generate initial survey data includes performing a participant detection and/or recognition analysis to ascertain the number, and relative locations, of the conference participants within the first portion 402 of the video conferencing environment 400. In some embodiments, the initial survey data is stored in the memory of the camera device 200 for later retrieval and analysis.

Figure 4A:
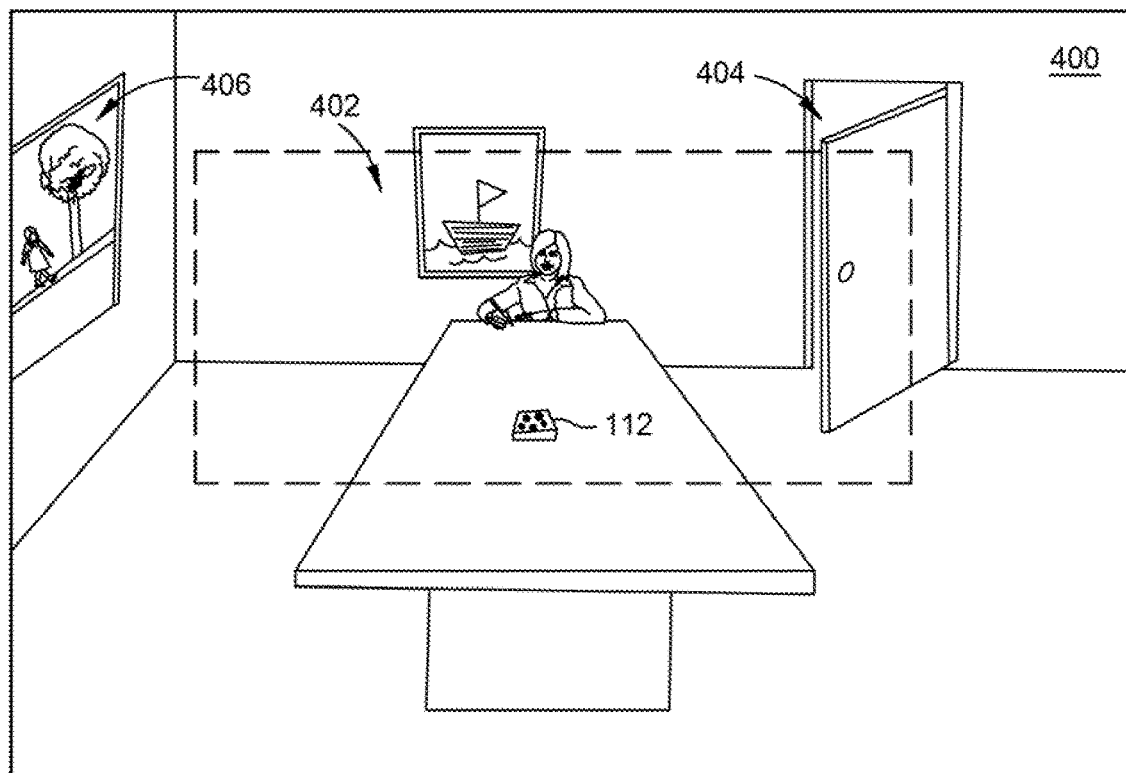
FIGS. 4A-4I are schematic representations of an exemplary video conferencing environment that relate to the video conferencing methods illustrated herein, according to one embodiment.
Figure 4B:
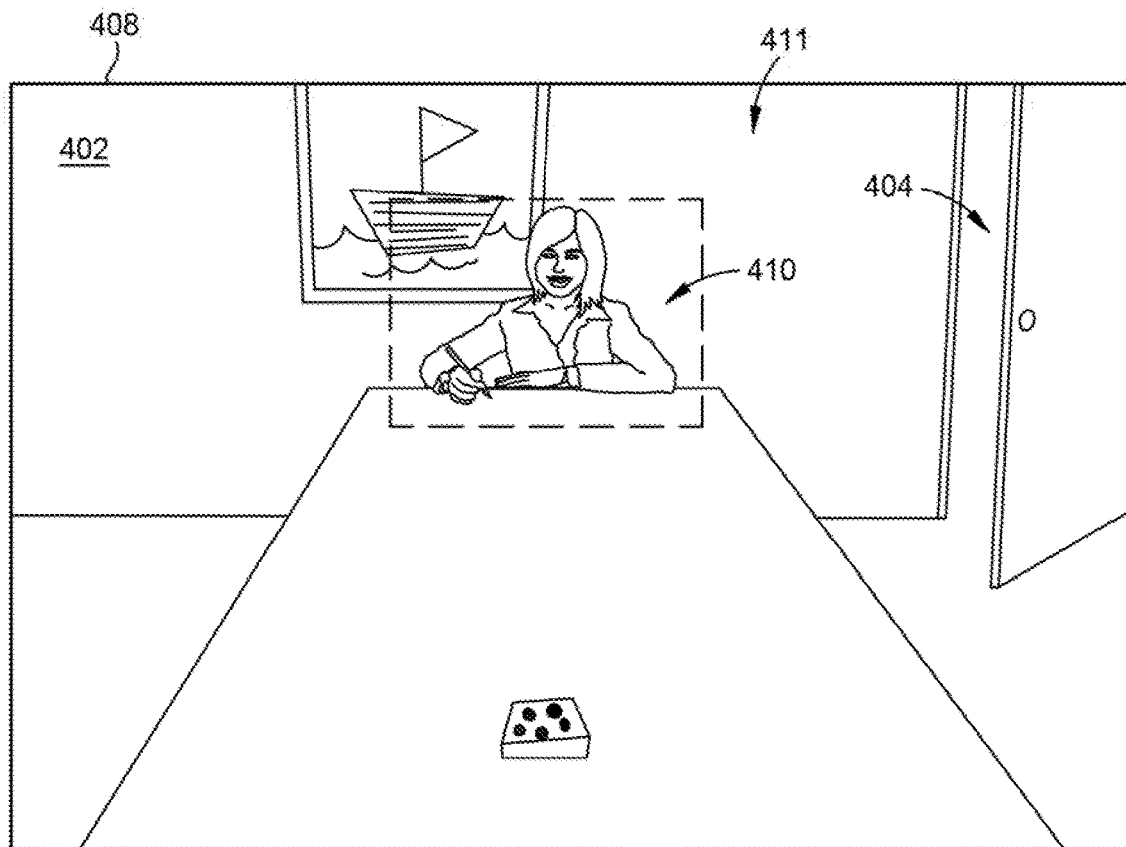

In some embodiments, optically framing the first portion 402 of the video conferencing environment comprises using any one or combination of panning, tilting, and optically zooming the camera device 200 to establish a desired actual field-of-view, such as the first actual field-of-view 408 (FIG. 4B). In other embodiments, the camera device 200 device may be pre-positioned and/or pre-configured (e.g., pre-optically zoomed) to capture the actual field-of-view 408 before the start of a video conferencing session, i.e., the desired first actual field-of-view may be fixed during the installation of the camera device 200. In those embodiments, the method 300 may not include activity 310. Here, the first actual field-of-view 408 is a field-of-view acquired by the image sensor 204 of the camera device 200, i.e., without digital cropping subsequently performed thereon.

At activity 320 the method 300 includes digitally framing a second portion 410 (FIG. 4B) of the video conferencing environment 400. In some embodiments, the activity 320 is performed after performing the initial setup performed in activity 310, such as after the installation of the camera device 200 within the video conferencing environment 400. Therefore, in those embodiments, activity 320 is typically performed at the start of each video conference, while activity 310 is generally only performed once during initial installation, initial setup and/or after performing maintenance activities on the camera device. Here, digitally framing the second portion 410 includes using a controller 206 of the camera device 200, to analyze one or more image frames, or a video stream, of the first actual field-of-view 408 to detect video conference participant activity and/or the location of conference participants therein. For example, the controller 206 may analyze multiple frames to detect changes in the video conferencing environment 400 over time, thus detecting the movement of conference participants.

In some embodiments, the controller 206 may use a participant detection and/or recognition software, such as an upper body detection software and/or a facial recognition software, to identify the location of conference participants and adjust the boundaries defining the second portion 410 accordingly. Typically, once the locations of conference participants are identified the controller 206 will use settings stored in the memory thereof and/or encoded in the one or more software applications 224 to define the boundaries of the second portion 410 about the identified locations of conference participants. For example, the controller 206 may be used to apply general principles of photography, such as the rule of thirds, to define the white space about a conference participant, or about a group of conference participants, to balance the composition of, and thus optimize, an apparent field-of-view of a video stream to-be-transmitted to remote conference participants.

In some embodiments, the boundaries defining the second portion 410 are determined using stored user preferences, and/or manually input by a user, such as by a conference participant using the user interface 208 set forth above in the description of FIG. 2. Thus, activity 320 of the method 300 may be performed by one or more software applications 224 executing on a controller 206 of the camera device 200 or may be performed manually by a user with the aid of a user interface 208. As shown in FIG. 4B, the boundaries defining the second portion 410 are not centered within the boundaries of the first actual field-of-view 408. In other embodiments, the boundaries of the second portion 410 will be centered within the first actual field-of-view 408. In some of those embodiments, the camera device 200 may be panned, tilted, and/or zoomed until the boundaries defining the second portion 410 are centered within the boundaries of a new first actual field-of-view (not shown).

Figure 4C:

Digitally framing the second portion 410 of the video conferencing environment 400 provides an apparent field-of-view, such as the first apparent field-of-view 412 shown in FIG. 4C, which may be captured and transmitted to a remote video conferencing endpoint 104 as described below in activity 330. The first apparent field-of-view 412 is encompassed within the first actual field-of-view 408. Thus, the first actual field-of-view 408 includes both the second portion 410 of the video conferencing environment 400 and an excluded region 411 (FIG. 4B) that is outside of the boundaries of the second portion 410. As discussed below, a stream of data that is transmitted to the remote video conferencing endpoint 104 from the camera device will include frames of the first apparent field-of-view 412, which is sometimes referred to below as the transmitted field-of-view.

In some embodiments, the boundaries of the first apparent field-of-view 412, and thus the amount of the video conference room contained within the first apparent field-of-view 412, are limited by a desired threshold image resolution. The limit of the desired threshold image resolution ensures a desired minimum image quality of the transmitted field-of-view that is to-be-transmitted in the video stream delivered to the remote video conferencing endpoint. In some embodiments, the amount of available digital zoom is limited so as to prevent the image resolution from falling below a desired level, such as, for example, below a 720p or below a 1080p resolution. Thus, in some embodiments, the minimum resolution created after achieving a desired digital zoom level is, for example, 720p or 1080p. In some embodiments, the desired threshold image resolution is communicated to the processor 212 and/or the video streaming device 218 by the video conferencing software application 118 executing on the user device 110 so that a desired image resolution can be reached during activity 320. In general, once a desired digital framing configuration (e.g., digital zoom level) is selected by the controller 206, the data streamed from the camera device 200 will be maintained at that digital zoom level until there is need to make an adjustment in the field-of-view, as is discussed below. In some embodiments, the boundaries of the first apparent field-of-view 412, i.e., the amount of available digital zoom, are limited by the software application 224 that is being executed on the processor 212 based on the known resolution capabilities of the camera device 200. For example, depending on the resolution capability of the camera device the digital zoom may be limited to about 4× or less, about 3.75× or less, about 3.5× or less, about 3.25× or less, about 3× or less, such as about 2.75× or less, about 2.5× or less, about 2.25× or less, or about 2× or less.

In some embodiments, the desired threshold image resolution is dynamically adjusted, by use of the processor 212 and one or more software algorithms stored in memory, based on changes in available bandwidth for transmitting the video stream to the user device 110 (FIG. 1) and/or from the user device 110 to a remote video conferencing endpoint (e.g., the second video conferencing endpoint 104).

At activity 325, the method 300 optionally includes optically framing (or optically reframing) the actual field-of-view of the camera device 200 about a third portion 413 (FIG. 4D) of the video conferencing environment 400 that is different from the first portion 402 used to provide the first actual field-of-view 408. In some embodiments, activity 325 is performed when the amount of digital zoom needed to frame a desired apparent field-of-view, such as the first apparent field-of-view 412 would result in a video stream having an undesirably poor image resolution, such as an image resolution below the desired threshold image resolution discussed above.

Figure 4D:
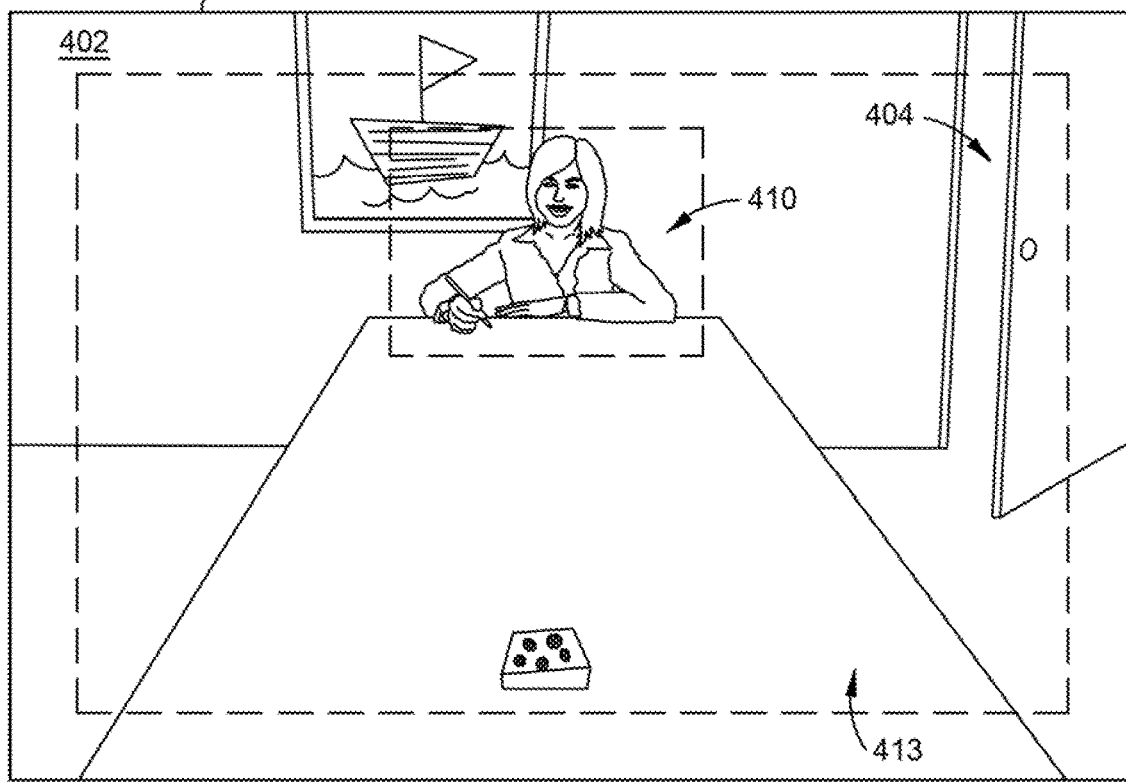
Figure 4E:
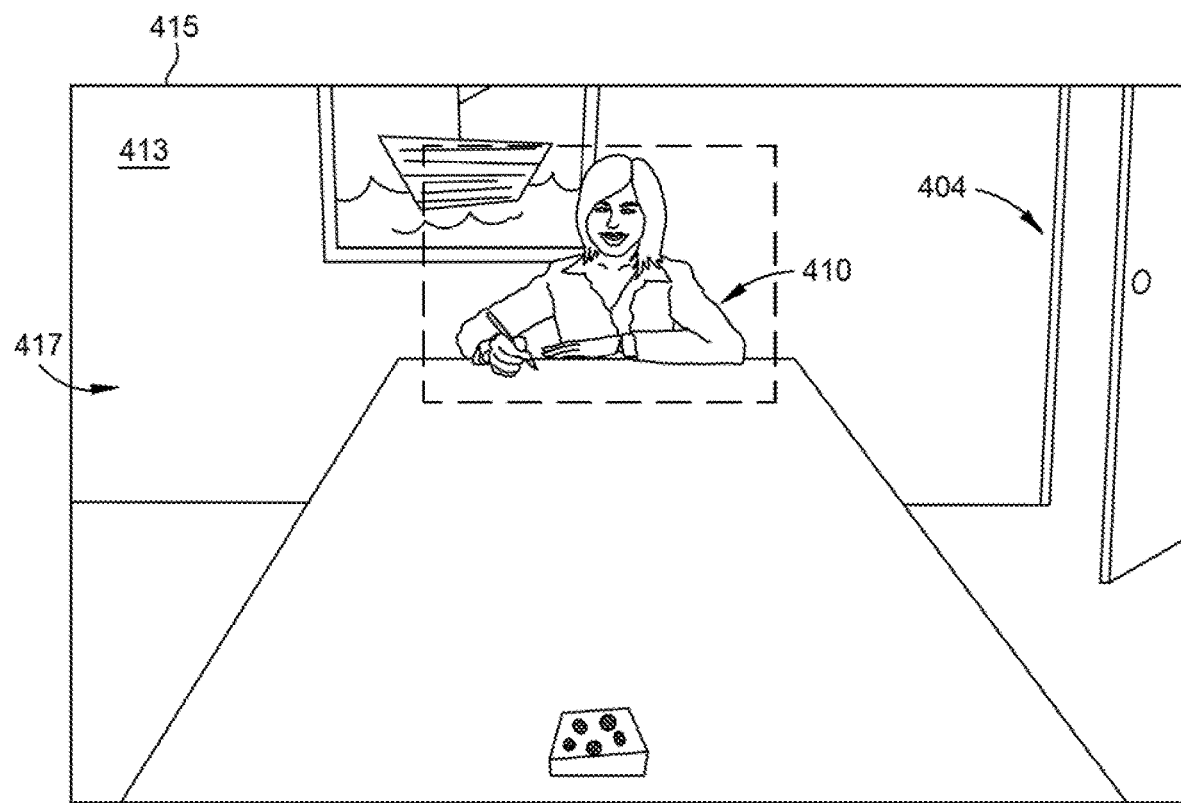

In some embodiments, such as shown in FIGS. 4D and 4E, optically framing the actual field-of-view about the third portion 413 provides a second actual field-of-view 415 (FIG. 4E) that is optically zoomed-in relative to the first actual field-of-view 408 (FIG. 4D). In other embodiments, a new actual field-of-view (not shown) may be optically zoomed-out relative to the first actual field-of-view 408. In some embodiments, activity 325 includes, simultaneously with optically framing (or optically reframing) the actual field-of-view, adjusting the digital zoom to maintain the boundaries of the first apparent field-of-view 412 set in activity 320. In some embodiments, activity 320 and activity 325 are performed at substantially the same time so that there is no noticeable interruption or perceptible change (as observed at a remote video conferencing endpoint 104) to the frame boundaries or the image quality of the first apparent field-of-view 412.

Advantageously, activity 325 may be used after activity 320, or concurrently therewith, to balance the competing objectives of maintaining a relatively wide actual field-of-view to be used in activities 340 and 350 (set forth below) with ensuring the image resolution of the apparent field-of-view does not fall below user expectations for the video quality received at the remote video conferencing endpoint 104. A relatively wide actual field-of-view is facilitated by prioritizing digital zoom over optical zoom up to the point where the image quality (e.g., pixilation) of the apparent field-of-view falls below the desired threshold image resolution set forth above. Once it is determined that the image resolution of the apparent field-of-view is at risk of falling below the threshold image quality, then optical zoom may be used to achieve the desired boundaries of the apparent field-of-view. Thus, one will note that with activity 325, the actual field-of-view (i.e., larger or smaller FOV) of the camera device 200 will change from the original field-of-view, e.g., the first field-of-view 408 created during activity 310 due to the change in the optical zoom position within the camera device 200 between these activities. A method which may be used in combination with, or in place of, activity 325 is set forth in FIG. 7 below.

At activity 330 the method 300 includes generating, or capturing, a video stream of the first apparent field-of-view 412. In some embodiments, generating the video stream of the first apparent field-of-view 412 includes using the video streaming device 218 of the camera device 200 to encode video data acquired from the image sensor 204.

In some embodiments, the video data acquired in activity 330 does not include data from the regions outside of the first apparent field-of-view, e.g., the excluded region 411 (FIG. 4B) or the excluded region 417 (FIG. 4E). In other words, instead of acquiring video data of an actual field-of-view using the image sensor 204 and performing one or more post-processing applications thereon, such as digital magnification and cropping using a software application, the video data (e.g., video frames) is acquired from only the portion of the image sensor 204 that corresponds to the first apparent field-of-view 412. Beneficially, the acquired video data can then be transmitted to the video conferencing software application 118, without the need for communication between the video conferencing software application 118 and the controller 206 of the camera device 200. Thus, the method 300 is invisible to the video conferencing software application 118 which advantageously facilitates seamless integration therewith.

In other embodiments, the video stream of the first apparent field-of-view 412 may be acquired post-processing, e.g., by cropping the first apparent field-of-view 412 from video data acquired from an actual field-of-view. Post-processing digital zoom may be done using a software application 224 which is being executed on the processor 212 of the camera device 200 or a different software application executing on the user device 110 after a video stream of the first actual field-of-view 408 has been transmitted thereto.

Typically, the acquired video data is encoded into a desired encoding format, at a desired resolution, e.g., 720p, 1080p, 1440p, 4K (2160p), or 8K (4320p), and at a desired frame rate, e.g., in a range from about 30 frames per second (fps) to about 60 fps or more. In some embodiments, the desired encoding format, resolution, and frame rate are communicated to the controller 206 of the camera device 200 from a video streaming software application executing on a user device 110, for example at the beginning of a video conferencing session using a handshake protocol. In some embodiments, the handshake protocol is between a video streaming device 218 of the controller 206 and the video conferencing software application 118. In some embodiments, one or both of the desired resolution and frame rate, and thus the bitrate of the video stream, are adjusted by the controller 206 based on changes in the bandwidth available for transmitting the video stream to the video conferencing software application 118 that is being executed on the user device 110, changed in the bandwidth available for transmitting the video stream to a remote video conferencing device for display, or both. A method that may be used to adjust the bitrate of the video stream based on available bandwidths for transmitting the video stream is set forth below in the description of FIG. 7. In some embodiments, one or both of the desired resolution and frame rate, and thus the bitrate of the video stream, are adjusted by the controller 206 based on a desired threshold image resolution that is set by a display resolution of a remote system (e.g., system at the second video conferencing endpoint 104) that is configured to receive the video stream at a remote location. In one example, the desired resolution is adjusted to a 720p or 1080p level due to the remote system being able to receive, process and/or display the information at a 720p or a 1080p resolution.

In some embodiments, activity 330 of the method 300 further includes transmitting the video stream to a video conferencing software application 118 that is being on the user device 110. In some embodiments, the video conferencing software application may perform further data processing methods on the video stream, e.g., by transcoding the received video data from a first format to a second format used by the video conferencing application, before transmitting the video stream to a remote video conferencing device for display.

At activity 340 the method 300 includes periodically generating survey frames of the actual field-of-view of the camera device 200. Here, the process of generating the video stream to-be-transmitted to a video conferencing software application that is being executed on a user device (i.e., activity 330) and generating survey frames of the current actual field-of-view (e.g., the first and/or second actual field-of-view 408, 415) to generate survey data are performed within the camera device 200. Typically, generating the to-be-transmitted video stream of the first apparent field-of-view 412, and generating the survey frames of the current actual field-of-view 408 or 415 are performed using the same image sensor 204 of the camera device 200.

Typically, each of the plurality of survey frames comprise a video frame of the actual field-of-view, or even a portion of the actual field-of-view, taken at different instants in time. In some embodiments, the survey frames may each include at least a portion of the first actual field-of-view 408 that is different from the first apparent field-of-view 412, for example, the survey frames may each contain at least a portion of the excluded region 411. In one example, the survey frames may each contain the first apparent field-of-view 412 and at least a portion of the excluded region 411. Herein, the plurality of survey frames are made up of a series of one or more survey frames periodically captured and simultaneously extracted from the video stream generated in activity 330 before the video stream is transmitted to the video conferencing software application executing on the user device. Thus, the to-be-transmitted video stream will generally not include the survey frames therein. In some embodiments, the survey data is stored in the memory of the camera device. A method 500 that may be used to periodically capture and simultaneously extract the survey frames from the video stream is set forth below FIG. 5.

At activity 345, the method 300 includes analyzing each of the plurality of survey frames to generate survey data 228. Analyzing the survey frames may include using a software application 224 executing on the processor 212 to detect and/or recognize conference participants located within the actual field-of-view, e.g., by use of convolutional neural network. Typically, information comprising the number and locations of the conference participants within the boundaries of the actual field-of-view and/or with reference to the video conferencing environment structure 226 is stored in the memory 214 of the controller 206 as the survey data 228.

Figure 4F:
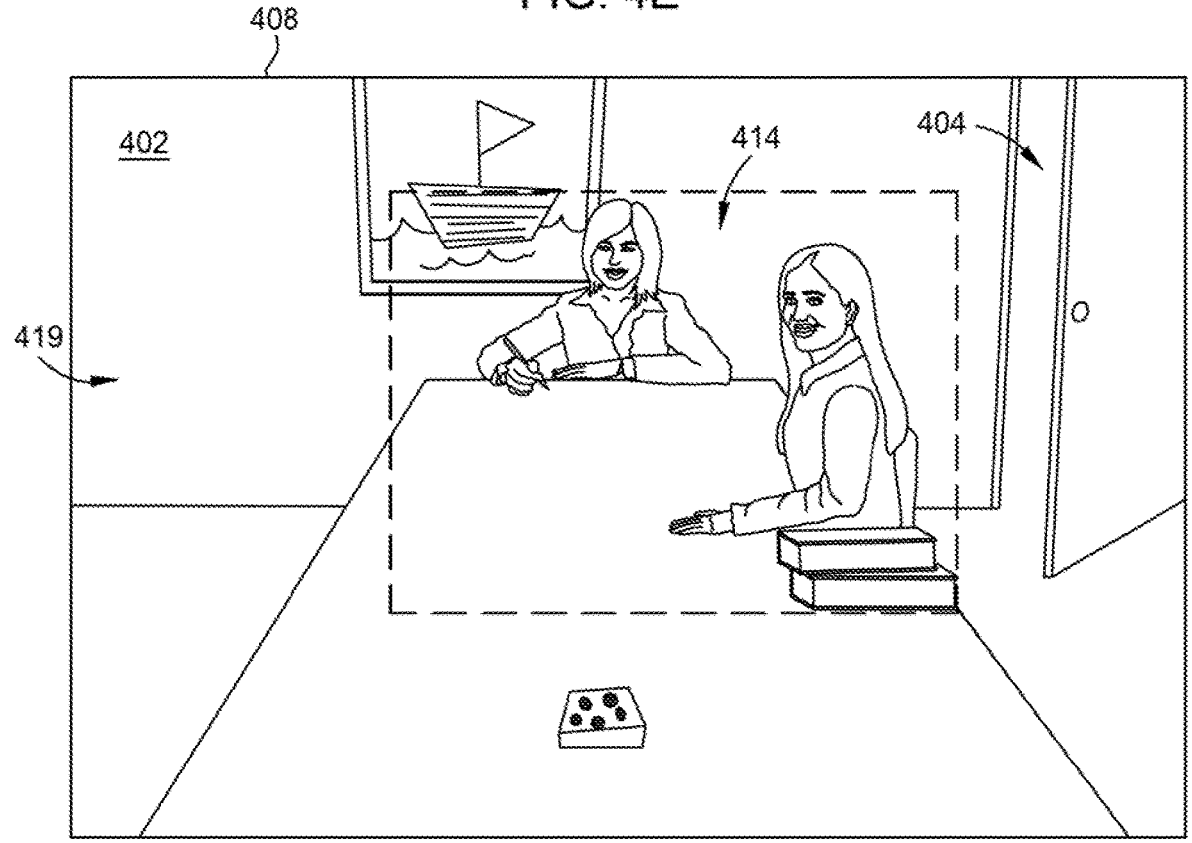
Figure 4G:
Figure 4H:
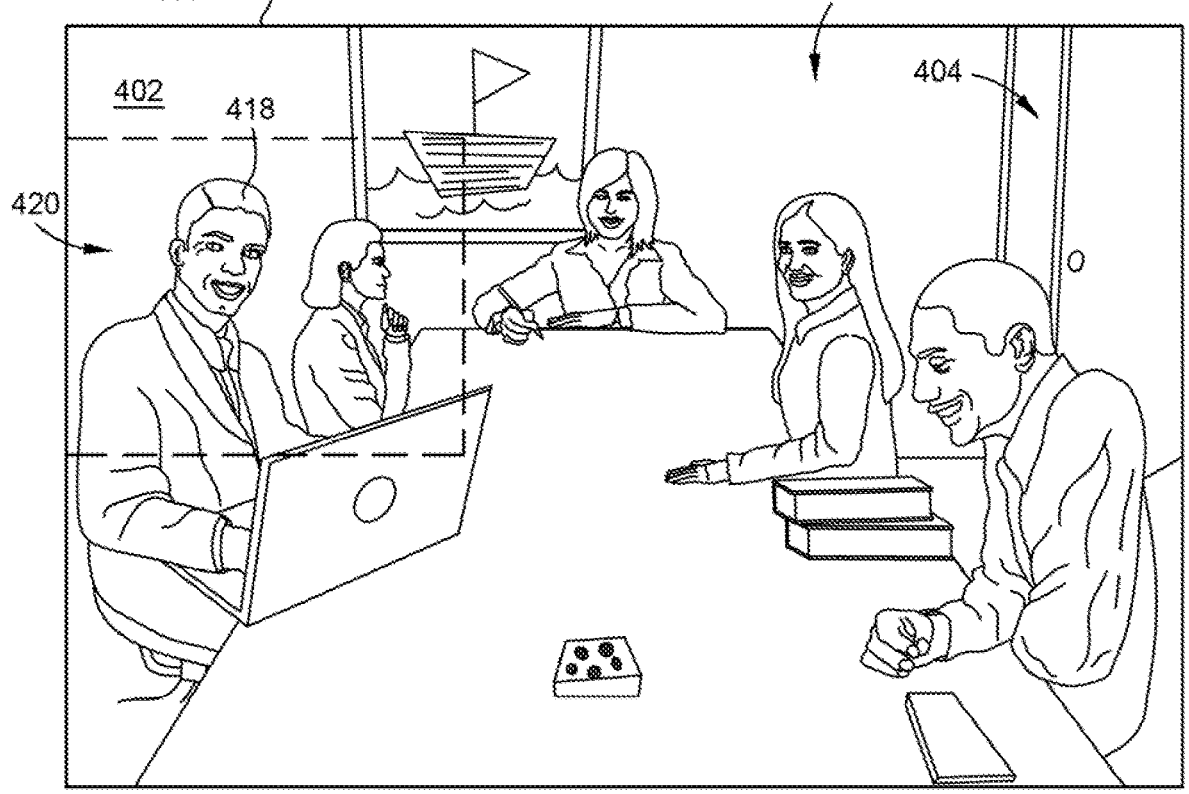
Figure 4I:
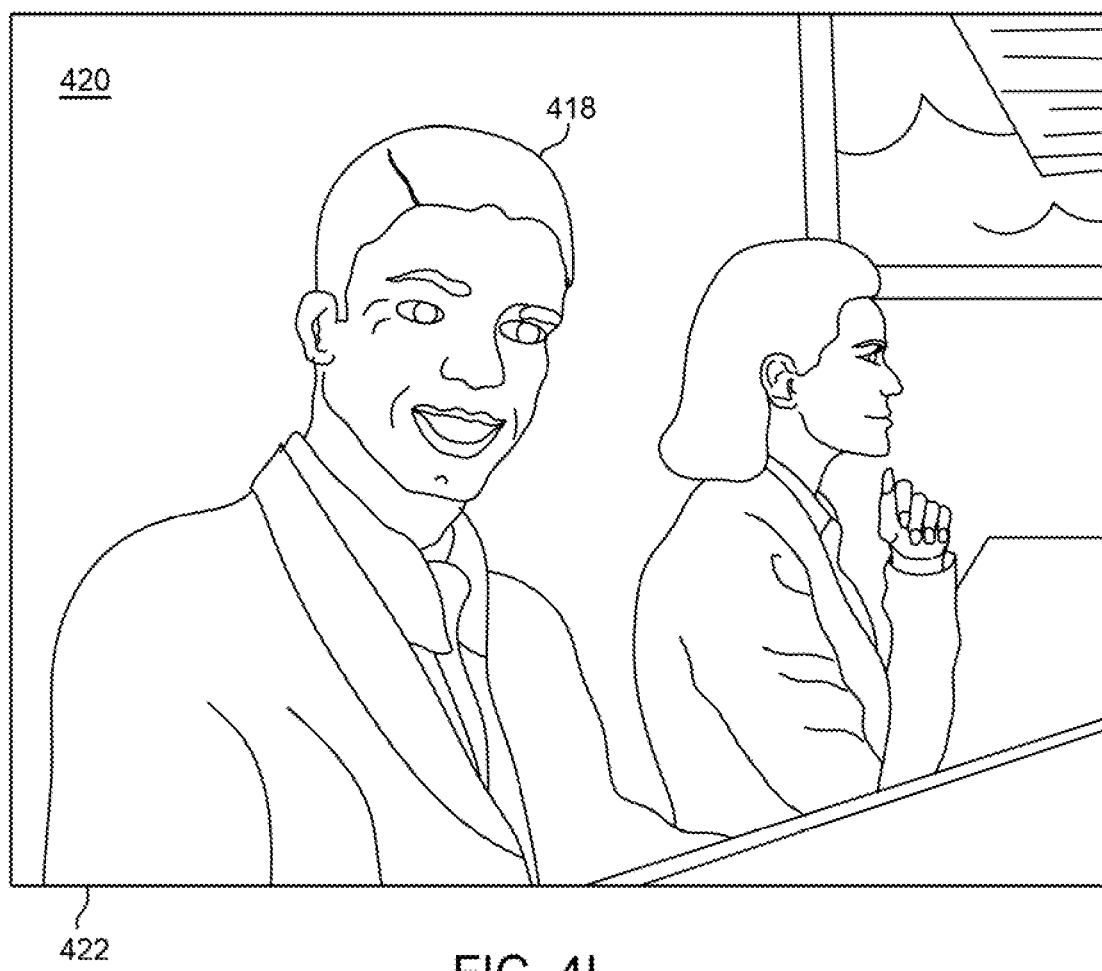

At activity 350, the method 300 includes detecting changes in the information found in the survey data 228 over time, such as the changes in the video conferencing environment 400 over time collectively illustrated in FIGS. 4A-4I. Typically, detecting changes in the survey data 228 includes using a software application executing on the controller 206 of the camera device 200 to compare the information in the survey data 228 acquired over time to determine if there have been changes in the video conferencing environment 400, which includes changes outside of the regions captured in the first apparent field-of-view 412 (e.g., in the first excluded region 411 (FIG. 4B) or the second excluded region 417 (FIG. 4E). For example, at the time a survey frame is acquired of the video conferencing environment 400 in FIG. 4B there is a single conference participant and the first apparent field-of-view 412 is defined about that single conference participant accordingly. Later, as shown in FIG. 4F, a second conference participant that has entered the video conferencing environment 400 is detected by the analysis of an acquired survey frame acquired thereof, and thus it may be determined that it would be desirable to adjust the frame boundaries of the to-be-transmitted video stream. Thus, by comparing survey data generated from a survey frame of the first actual field-of-view 408 taken at the time of FIG. 4B with survey data generated from a survey frame of the first actual field-of-view 408 taking at the later time of FIG. 4E, the software application 224 executing on the controller 206 can determine that the second conference participant has joined the meeting, i.e., detect a change in the survey data over time.

At activity 360 the method 300 includes making an adjustment to the apparent field-of-view or actual field-field-of-view based on the analysis of the survey data performed in activity 350. Typically, as the number and/or locations of conference participants' changes during a video conferencing session, it will be desirable to again adjust the frame boundaries of the captured video stream. For example, based on the detected changes in the survey data a fourth portion 414 (FIG. 4F) of the video conferencing environment 400 may be digitally framed or optically framed to provide a second apparent field-of-view 416 (FIG. 4G) that includes the late arriving second conference participant which is different from the first apparent field-of-view 412 (FIG. 4C) digitally framed in one of the previous activities. Thus, in some embodiments the method 300 further includes adjusting the digitally framing, using the camera device 200, a fourth portion 414 of the video conferencing environment to provide a second apparent field-of-view 416. The second apparent field-of-view 416 is encompassed within a current actual field-of-view, here the first actual field-of-view 408, to allow for continued monitoring for changes in activity in the excluded region 419 (FIG. 4F). However, in general, the controller 206 can decide to make an adjustment to the field-of-view provided in the generated video stream (i.e., activity 330) and/or an adjustment to the orientation of the camera device (e.g., PTZ adjustment) can be made based on the analyzed survey data 228.

In some embodiments, the activity 350 of the method 300 further includes determining which one of a plurality of conference participants is speaking and then in activity 360 adjusting the boundaries of the digitally framed field-of-view accordingly. For example, in some embodiments facial detection and/or recognition analysis on the survey frames and/or the to-be-transmitted video stream and/or audio location data determined from the microphones 210 on the camera device 200 may be used to determine a specific conference participant is speaking, such as the participant speaker 418 shown in FIG. 4H. Once a participant speaker 418 is identified, any one or combination of the activities of the method 300 set forth above may be used to digitally frame a portion of the video conferencing environment, here the fourth portion 420 (FIGS. 4H-4I) to provide a third apparent field-of-view 422 (FIG. 4I) composed about the speaker 418. Beneficially, the third apparent field-of-view 422 is encompassed within the a current actual field-of-view, here the first actual field-of-view 408 to allow for continued monitoring for changes in activity in an excluded region 421.

In some embodiments, the activity 350 of the method 300 further includes monitoring a point of interest, such as the door 404, for a change in activity and adjusting the actual based thereon. For example, if a late arriving conference participant were to enter the video conferencing environment 400 through the door 404 and then disappear from the first actual field-of-view 408, the controller 206 of the camera device 200 might recognize that the late arrival is in the video conferencing environment 400 but outside of the actual (first) field-of-view 408 of the image sensor 204. Thus, during activity 360 the actual field-of-view may then be adjusted by optically reframing the video conferencing environment 108, e.g., optically zooming out, until the new actual field-of-view includes the new arrival's location. Once the new arrival is "found," one or more activates of the method 300 can be repeated until the new conference participant is desirably included within an apparent field-of-view of the camera device 200.

In other embodiments, the method 300 further includes excluding points of distraction from the analysis of the survey data. For example, here it may be desirable to ignore changes in activity that are observable through the window 406 (FIG. 4A) even if the window 406 were to be included in the actual field-of-view of the camera device 200 during the video conferencing session.

In embodiments herein various activities of the method 300 may be repeated throughout a video conferencing session to continuously update a digitally framed field-of-view as new conference participants join (FIG. 4H) and/or leave the video conferencing environment 400 and/or as other changes in activity are detected therein. In some embodiments, the camera device 200 may include a manual override feature to prevent the method 300 from usurping control from a user who has manually adjusted the apparent frame of view. For example, if a user has used the user interface 208 of FIG. 2 to frame a desired portion of the video conferencing environment the manual override would pause or stop the method 300. In some embodiments, the manual override is configured to detect multiple manual interventions within a relatively short time frame, such as within one minute or less, which may be indicative of "persistent fixing" of the field-of-view by a user. Typically, if persistent fixing is detected, the controller 206 will cede control of the zoom features to the user. In such circumstances, the manual override would last until the camera device 200 is returned to a home position and/or there is a stop and restart to the video stream to signal the beginning of a new or different video conferencing session.

Beneficially, aspects of the method 300, may be performed without the need to copy and store the to-be-transmitted video stream or perform other post processing operations thereon. Performing one or more aspects of the method 300 without the need for post processing allows for seamless integration with readily available video conferencing software applications 118 as the method 300 may be performed independent of the application and is thus invisible thereto. Typically, the video conferencing software application 118 can override the method 300, to control the optical and digital zoom features of the camera device 200 if such control is desired. In some embodiments, the method 300 is entirely performed using the controller 206 of the camera device 200, thus minimizing the bandwidth of the to-be-transmitted video stream for the benefit of wireless communication methods or any other communication method of limited bandwidth.

Figure 5:
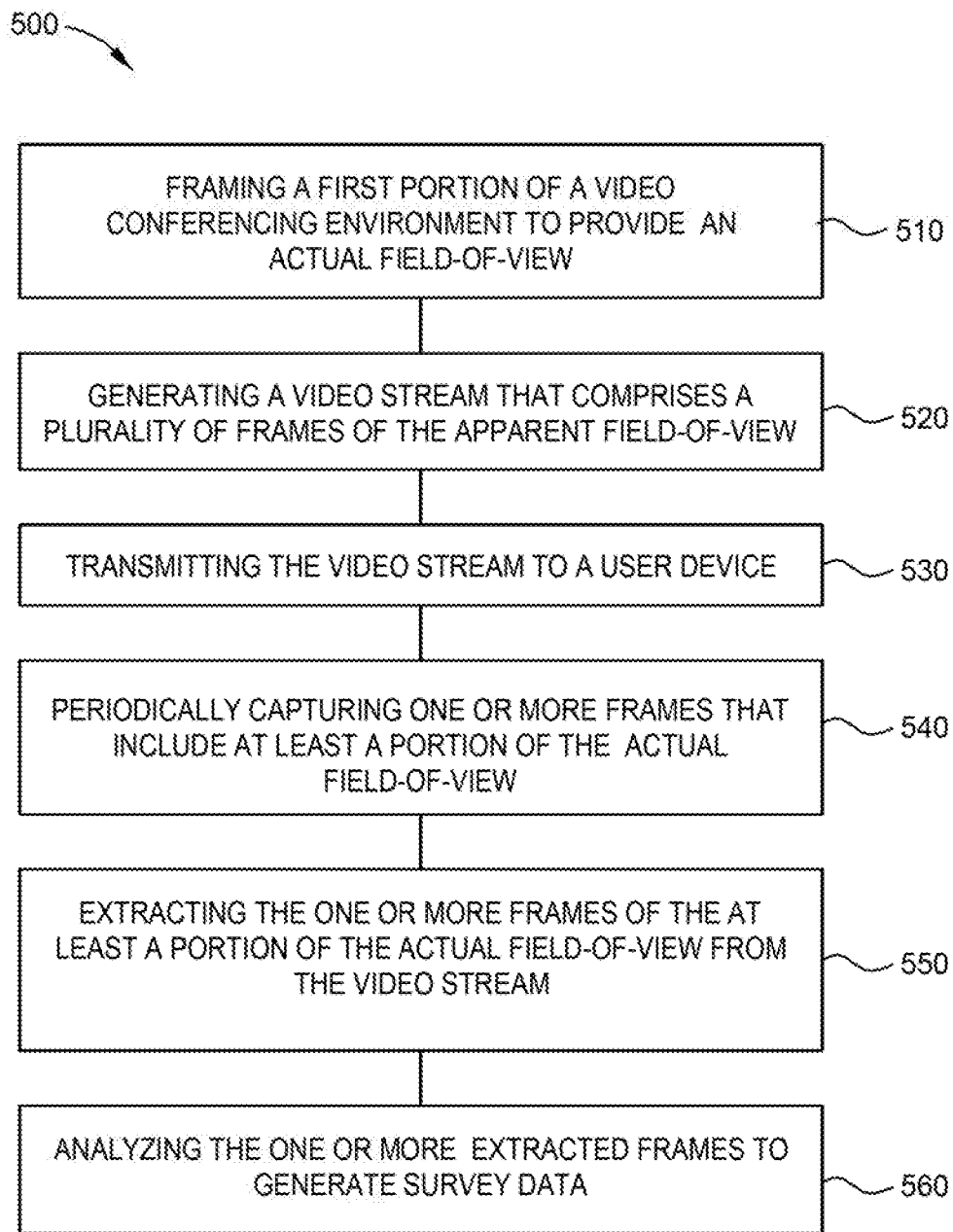
FIG. 5 is a diagram illustrating a method of monitoring a video conferencing environment, according to one embodiment, that may be used in combination with the video conferencing method set forth in FIG. 3.
Figure 6:
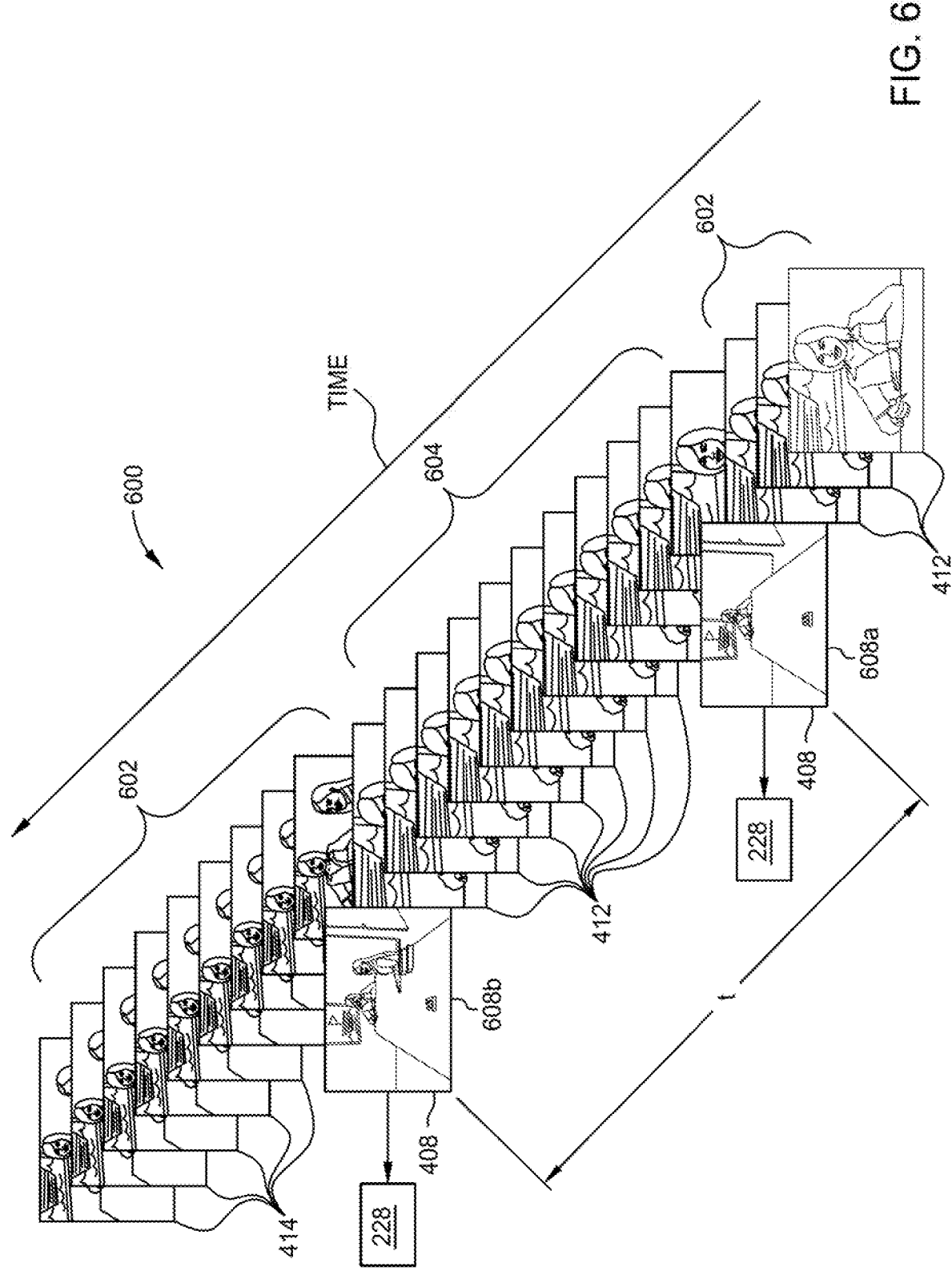
FIG. 6 is a schematic representation of a video stream, according to one embodiment, that illustrates various aspects of the method set forth in FIG. 5.

FIG. 5 is a diagram illustrating a method 500 of monitoring a video conferencing environment, according to one embodiment, that may be used in combination with the video conferencing method 300 set forth in FIG. 3. The method 500 may be used with the combined camera device 116 and controller 124 of FIG. 1 and/or with the camera device 200 of FIG. 2. FIG. 6 is a schematic representation of a portion of a video stream 600, according to one embodiment, that illustrates various aspects of the method 500. The video stream 600 shows pluralities (three shown) of sequentially acquired frames 602, 604, and 606 of apparent field-of-views acquired by the camera device 200. The first plurality 602 and the second plurality 604 each comprises sequentially acquired frames of the first apparent field-of-view 412 described above in FIG. 4C. The third plurality 606 comprises sequentially acquired frames of the second apparent field-of-view 416 described above in FIG. 4G. Here, the video stream 600 is periodically interrupted to capture a survey frame 608a, 608b of the video conferencing environment where the survey frames 608a, 608b include video data from the first actual field-of-view 408 (FIG. 4B) described above. Generally, the survey frames 608a, 608b are pulled from the video stream 600 before the video stream 600 is transmitted to the video conferencing application executing on the user device 110. In other embodiments, and as further described below, the survey frames 608a, 608b are acquired between sequentially acquired frames of the to-be-transmitted video stream 600 without any interruption thereto.

At activity 510, the method 500 includes framing a first portion of a video conferencing environment to provide a first actual field-of-view 408. Here, the first actual field-of-view 408 of FIG. 6, represents an actual field-of-view acquired by an image sensor 204 of the camera device 200.

At activity 520 the method 500 includes generating a to-be-transmitted video stream 600 (FIG. 6) which includes frames of the apparent field-of-views 412, 416 acquired by the camera device 200. Here, the boundaries of the first actual field-of-view 408 and the boundaries of the apparent field-of-views 412, 416 encompassed therein, define the respective excluded regions 411 (FIG. 4B) and 417 (FIG. 4D). In some embodiments, generating the video stream of an apparent field-of-view incudes acquiring video data from a portion of the actual field-of-view detected by the image sensor 204 of the camera device 200, where the acquired video data does not include data corresponding to an excluded region 411, 417. Thus, the generated video data does not require a post-processing magnification and cropping software application to achieve the desired apparent field-of-view. Beneficially, the captured video stream may be transmitted, directly or indirectly, to a video conferencing software application 118 that is being executed on a user device 110 without an added video data processing activity occurring therebetween. Thus, the method 500 may be invisible to the video conferencing software application 118 which beneficially facilitates seamless integration therewith.

Herein, the to-be-transmitted video stream 600 does not include survey frames of the actual field-of-view 408 which are extracted (pulled) from the video stream 600 as described below.

At activity 530, the method 500 includes transmitting the video stream 600 to a video conferencing software application 118 that is being executed on a user device 110, such as described in the method 300.

At activity 540, the method 500 includes periodically generating, one or more survey frames of the actual field-of-view. In one example, the frames of the first actual field-of-view 408 are shown as survey frames 608a, 608b in FIG. 6 and which may be used as the survey frames described above in the method 300. The survey frames may each include at least a portion of the first actual field-of-view 408 that is different from the first apparent field-of-view, such as the survey frames may contain at least a portion of the excluded region 411.

Generally, the frame rate capability of the camera device 200 will be equal to or greater than the frame rate requested by the video conferencing software application 118, e.g. a frame rate requested during a handshake protocol with the video streaming device 218 at the beginning of a video conferencing session. Thus, in some embodiments, generating the one or more survey frames of the first actual field-of-view 408 includes using the digital zoom feature of the camera device 200 to digitally zoom out, e.g., cease digitally cropping the actual field-of-view, between sequentially acquired frames of the to-be-transmitted video stream 600. For example, in some embodiments, the camera device 200 may be capable of providing a frame rate of about 40 frames per second (fps) or more, such as about 50 fps or more, or about 60 fps. In this example, the to-be-transmitted video stream 600 requested by the video conferencing software application 118 is less than the frame rate capabilities of the camera device 200 such as less than 60 fps, less than 50 fps, or less than 40 fps, or about 30 fps or less. In those embodiments, the camera device 200 may be used to digitally zoom out and acquire a frame of the first actual field-of-view 408 without interruption to the to-be-transmitted video stream 600, e.g., without changes to the time intervals between sequentially acquired frames of the apparent field-of-view(s) 412, 416.

In other embodiments, generating the one or more survey frames of the first actual field-of-view 408 includes using the digital zoom feature of the camera device 200 to digitally zoom out, e.g., cease digitally cropping the actual field-of-view for a limited number of sequentially acquired frames of the video stream 600. In those embodiments, generating the one or more survey frames of the actual field-of-view includes periodically interrupting the video stream of the apparent fields of view 412, 416.

One will note that using the digital zoom feature of the camera device 200 to generate even one survey frame may cause a disruption between generated frames of video data within a video stream if the survey frame is not removed therefrom. In other words, the field-of-view transmitted from the video streaming device 218 to the video conferencing software application 118 would briefly flicker from the desired apparent field-of-view to the first actual field-of-view 408 during the time the survey frame is being generated. Thus, to avoid any perceived discontinuity in the video stream 600 by a remote conference participant, the one or more captured frames of the first actual field-of-view 408, here the survey frames 608a, 608b are extracted ("pulled") from the to-be-transmitted video stream 600 before the video stream 600 is transmitted to the video conferencing software application 118. In embodiments where generating the one or more survey frames includes periodically interrupting the view stream of the apparent fields of view 412, 416 the number of actual field-of-view frames that are generated are limited to a number that will not be perceived by a viewer.

At activity 550, the method 500 includes extracting the one or more generated frames of the first actual field-of-view 408, e.g., the survey frames 608a, 608b, from the video stream 600 before the video stream 600 is transmitted to the video conferencing application. Extracting the survey frames typically includes using a software application 224 that is being executed on the controller 206 of the camera device 200. For example, in some embodiments the software application 224 executing on the controller 206 of the camera device 200 may instruct the video streaming device 218 to pull the generated survey frames 608a, 608b from the video stream to-be-transmitted to the video conferencing software application 118. The survey frames 608a, 608b may be stored in the memory 214 as survey data 228 for later use by a method set forth herein.

When used, the frequencies and duration of the periodic interruptions to generate the above described survey frames 608a, 608b are selected to ensure that a remote conference participant will not perceive the loss of the frames (a gap) from the video stream. Typically, the loss of a single frame per second from a video stream of 30 frames per second would likely be imperceptible to a user and more frames could be extracted without detection by a user as the rate of frames per second is increased. In some embodiments, the rate of interruption and extraction of survey frames from the video stream may be, for example, more than 1 every 10 frames, no more than 1 every 20 frames, or no more than 1 every 30 frames. In some embodiments, a lost frame (e.g., extracted frames) can be compensated for by duplicating an immediately preceding frame of the video stream, which is then added into the video stream 600 in the lost frame's position.

In some embodiments, the generation and extraction of the survey frames may occur at regularly timed intervals, such as the time interval "t" of FIG. 6, such as once every 1 second. In other embodiments, the intervening time intervals between generation and extraction of survey frames may be varied based on detected changes in activity, or a lack thereof, in a video conferencing environment 400. For example, if no activity is detected between one or more consecutively pulled survey frames 608a, 608b, the time interval t may be increased from 1 second to 2 seconds. If no change is detected between consecutively pulled survey frames at a 2 second interval the time interval may be again increased, e.g., to 5 seconds, and so on until a minimum desirable interval between consecutively pulled survey frames, as set in a software application 224 in the controller 206 is reached, such as at least every 10 seconds, at least every 20 seconds, at least every 30 seconds, or for example, at least every one minute. Typically, once a change in consecutively pulled survey frames 608a, 608b is detected the survey rate will be increased, such as back to once every second.

At activity 560, the method 500 includes analyzing the one or more survey frames to generate survey data, such as described in activity 345 of the method 300. Typically, survey data is stored in the memory 214 of the camera device 200 where it may be later retrieved for further analysis such as described in activity 350 of the method 300.

Figure 7:
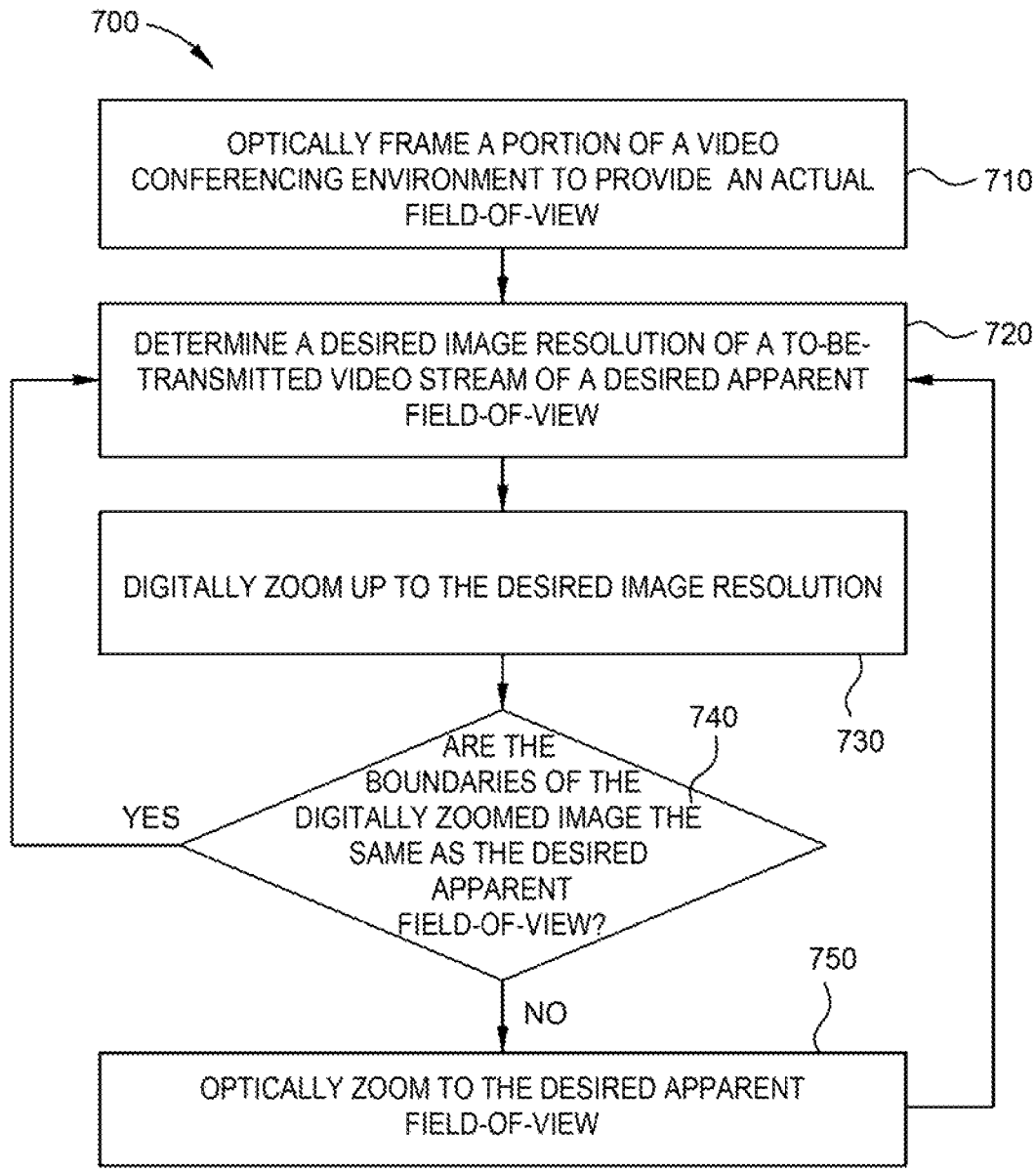
FIG. 7 is a flow diagram illustrating a method of auto framing a portion of a video conferencing environment, according to one embodiment, which may be used in any combination with the other methods set forth herein.

FIG. 7 is a flow diagram illustrating a method 700 of automatically framing a portion of a video conferencing environment, according to one embodiment. The method 700 may be used with the camera device 116 and controller 124 of FIG. 1, with the camera device 200 of FIG. 2 and/or performed by one or more software applications executing on the controller 206 of the camera device 200. The method 700 may be used in any combination with one or both of the methods 300 and 500 respectively set forth in FIGS. 3 and 5 above. As discussed above, prioritizing digital zoom over optical zoom is not without difficulty and could potentially result in undesirable pixilation in the video stream which may be detectable to a remote conference participant positioned at a remote location. In some embodiment herein, the boundaries used to define an apparent field-of-view, i.e., the amount of digital zoom available to define, are limited by a threshold value to ensure a desired minimum image quality of the to-be-transmitted video stream, as set forth in the method 300. In other embodiments, it may be desirable to digitally zoom in to frame an apparent field-of-view beyond what is allowable by the threshold value. For those embodiments, the method 700 provides for a prioritization scheme of optical zoom→digital zoom→optical zoom.

At activity 710, the method 700 includes with optically framing, using a camera device 200, a portion of a video conferencing environment to provide a first actual field-of-view. Optically framing the first portion of the video conferencing environment may include any one or combination of panning, tilting, and optically zooming the camera device. The level of the optical zoom created during activity 710 may be preset or selected based on an analysis of the conference room environment by the components within a controller 206 of the camera device 200.

At activity 720, the method 700 includes determining a desired threshold image resolution of a to-be-transmitted video stream of a desired apparent field-of-view. In some embodiments, the desired threshold image resolution is communicated to a controller of the camera device 200 during a handshake protocol between a video conferencing software application 118 and a video streaming device 218 of the controller 206. In some embodiments, the desired threshold image resolution is encoded in a software application 224 of the camera device 200. In some embodiments, the desired threshold image resolution is input and stored in the memory 214 of the camera device 200 as a user preference. In some embodiments, the desired threshold image resolution is set by a display resolution of a remote system (e.g., remote video conferencing system) that is configured to receive the to-be-transmitted video stream at a remote location. The display resolution information used to set the threshold image resolution can be input and stored in the memory 214 of the camera device 200 as a user preference or be received by the camera device 200 in a signal generated by the remote system. In some embodiments, the desired threshold image resolution is a dynamic value that changes based on available bandwidth for transmitting the video stream to the video conferencing software application 118 which is being executed on the user device 110 and/or the available bandwidth between different video conferencing endpoints. The desired apparent field-of-view is typically determined using the controller 206 of the camera device 200 to analyze one or more survey frames acquired from an actual field-of-view, e.g., to detect activity and/or the location of conference participants therein, such as described above in the method 300 of FIG. 3.

At activity 730, the method 700 includes digitally zooming, using a digital zoom feature of the camera device 200, up to the desired threshold image resolution, to provide a digitally zoomed image.

At activity 740, the method 700 incudes comparing the digitally zoomed image to the desired apparent field-of-view to determine a difference therebetween. If the boundaries of the desired apparent field-of-view, as determined at activity 720, are the same as the boundaries of the digitally zoomed image the method 700 will end until a new or different apparent field-of-view is desired. In other words, if a change in activity or participants in the video conferencing environment is detected using the methods set forth above, the desired apparent field-of-view may change, and the method 700 will start again at activity 720. If the desired apparent field-of-view is larger than the digitally zoomed image, i.e., appears further away than the apparent field-of-view, then the method 700 will continue to activity 750.

Activity 750 of the method 700 includes optically zooming, using an optical zoom feature of the camera device, up to the desired apparent field-of-view, at which point the method 700 will end until a new or different apparent field-of-view or threshold image resolution is desired.

The method 700 beneficially balances the desire to maintain a relatively wide actual field-of-view, useful for monitoring the video conferencing environment, with ensuring the image resolution of the apparent field-of-view does not fall below user expectations for the video quality received at a remote conferencing endpoint. Maintaining the relatively wide actual field-of-view is facilitated by prioritizing digital zoom over optical zoom. To maintain image quality, digital zoom over optical zoom only up to the point where the image quality (e.g., pixilation) of the apparent field-of-view falls below the desired threshold image resolution set forth above. Once it is determined that the image resolution of the apparent field-of-view is at risk of falling below the threshold image quality, then optical zoom may be used to achieve the desired boundaries of the apparent field-of-view. Thus, one will note that the actual field-of-view (i.e., larger or smaller FOV) of the camera device 200 may change during implementation of the method 700.

The methods set forth herein advantageously provide for continuous monitoring and optimization of an apparent field-of-view of a video stream to-be-transmitted to remote conference participants for the viewing benefit thereof. Nonetheless, it is recognized that frequent adjustments to the boundaries of the apparent field-of-view could be undesirably annoying and/or disorienting to a remote viewer. Thus, in some embodiments, adjustments to the field-of-view are controlled using the method 800 illustrated in FIG. 8.

Figure 8:
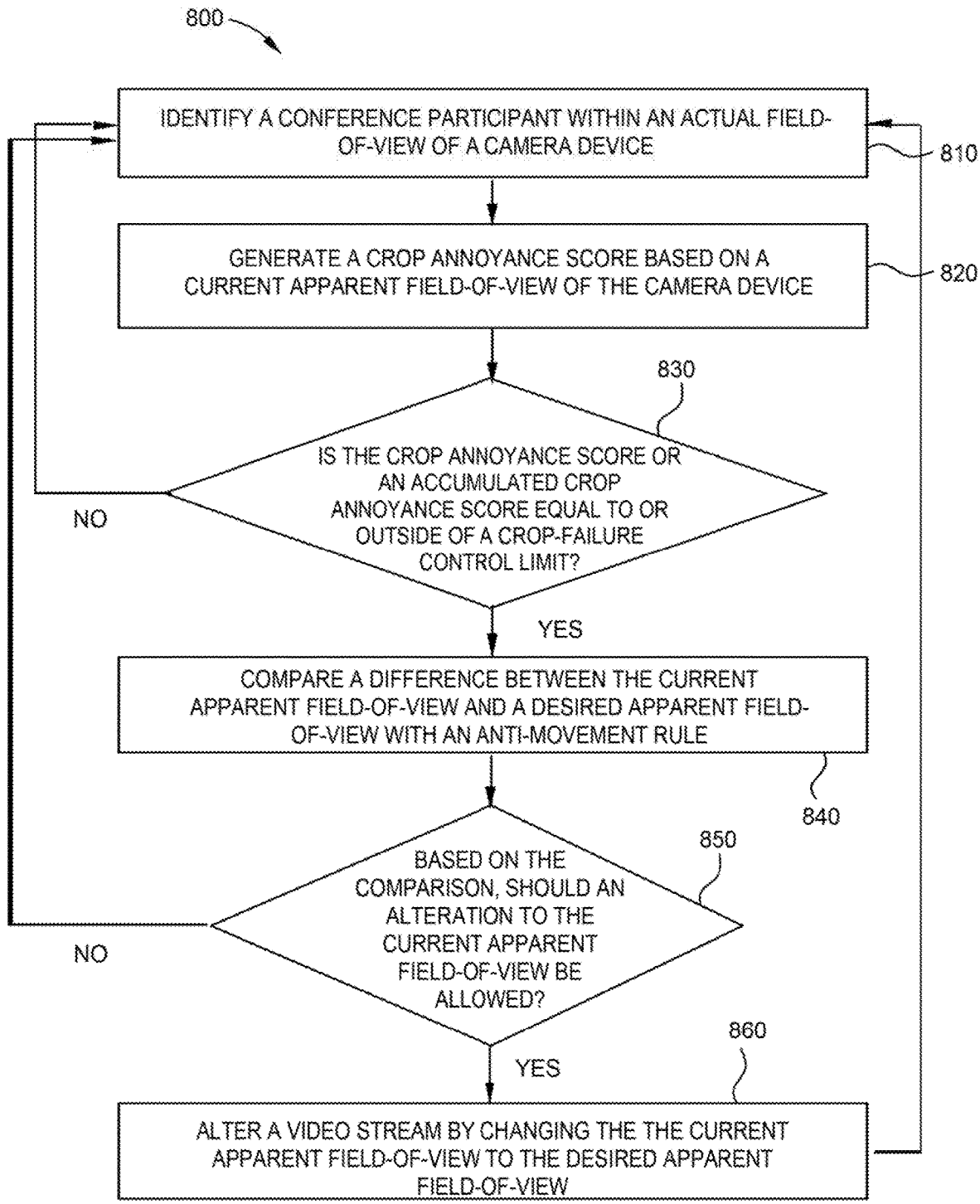
FIG. 8 a flow diagram illustrating a method for adjusting the apparent field-of-view of a to-be-transmitted video stream of a video conferencing environment, according to one embodiment, and which may be used in any combination with the other methods set forth herein.

FIG. 8 a flow diagram illustrating a method 800 for adjusting the apparent field-of-view of a to-be-transmitted video stream of a video conferencing environment, such as the video conferencing environment illustrated in FIGS. 4A-4I, according to one embodiment. Here, adjustments to the apparent field-of-view are controlled using software instructions that are stored in memory and executed by a processor. The software instructions can include one or more algorithms that can be trained to better perform a desired method or function, such as a machine learning artificial intelligence (AI) algorithm. In some embodiments, the method 800 includes training the machine learning AI. The method 800 may be used in combination with any of the embodiments described herein, such as in combination with the camera device 116 and controller 124 set forth in FIG. 1, in combination with the camera device 200 of FIG. 2, and/or in combination with the method 300 set forth in FIG. 3.

At activity 810 the method 800 includes identifying the locations of one or more conference participants within an actual field-of-view of a camera device. In this activity, a software algorithm running within the camera device 116, camera device 200 or controller 124, for example, analyzes data within a generated survey frame to detect conference participants within the actual field-of-view and to identify the locations thereof. Analyzing the survey frames may include using a software application 224 executing on the processor 212 to detect and/or recognize conference participants located within the actual field-of-view, e.g., by use of convolutional neural network.

At activity 820 the method 800 includes determining the locations of each of the one or more conference participants relative to the boundaries of an apparent field-of-view of the camera device 200 to generate one or more crop-failure scores. Here, each crop-failure score indicates the undesirability of a boundary of the current apparent field-of-view, i.e., the amount of crop or cropping, relative to the location of the corresponding conference participant. Generally, a relatively high crop-failure score indicates that the crop defining a boundary of the current apparent field-of-view relative to a conference participant is highly undesirable (e.g., a noticeable and/or significant portion of the participant is cropped) while a null crop-failure score indicates that the crop defining the boundary of the relative to the conference participant is ideal (e.g., a small portion or no portion of the participant is cropped and the location of the participant within the apparent field-of-view has a desirable symmetry). In one example, a relatively high crop-failure score may be assigned when an individual conference participant is located completely outside of a boundary of the current apparent field-of-view and slightly lower score (but still relatively high) may be assigned if only a portion of the participant is located outside of the boundary. In another example, a relatively low crop-failure score may be assigned if a conference participant has shifted slightly in their chair so that the white space defined about the conference participant is no longer of an ideal composition, e.g., the conference participant is no longer centered within the current apparent field-of-view.

In some embodiments, the crop-failure scores are determined using a using a software application, such as the crop-failure score generator 230 executing on the processor 212, to assign a crop-failure score selected from a group of crop-failure scores which have been predetermined based on likely failure events. For example, crop-failure scores may be predetermined for failure events such as a participant located outside of the apparent field-of-view or a portion of a participant located outside of the apparent field-of-view. When the failure event includes a portion of a participant located outside of the apparent field-of-view, a corresponding crop-failure score may be determined by analyzing what portion of the participants body falls outside of the apparent field-of-view. For example, an failure event where an upper boundary of an apparent field-of-view crops all or a portion of a participant's head may generate a higher crop-failure score than a crop-failure score which is generated from an failure event where a left or right boundary of the apparent field-of-view crops all or a portion of a participant's shoulder.

Typically, at least one crop-failure score is generated for each conference participant identified at activity 810. In some embodiments, crop-failure scores for an individual conference participant are generated for each of boundaries defining the current apparent field-of-view. For example, for the generally rectangular apparent fields-of-view illustrated herein, up to four crop-failure scores may be generated for each individual conference participant each time a survey frame is analyzed at activity 810. Thus, if two conference participants are detected in the data from a survey frame at activity 810, up to eight crop-failure scores may be generated for that survey frame. If the number of conference participants remains the same and a survey frame is generated every one second, then up to eighty crop-failure scores may be generated in a 10 second time period. Here, the individual crop-failure scores are stored in the memory 214 of the controller 206 as the crop-failure data 232, which is also referred to herein crop data or field-of-view data.

At activity 830 the method 800 includes comparing the crop-failure score or an accumulation of the crop-failure scores to a predetermined crop-failure tolerance limit which is stored in the memory 214. The crop-failure tolerance limit may be a lower limit or an upper limit. In some embodiments, the crop-failure score or the accumulation of crop-failure scores may be compared to both lower and upper tolerance limits. Whether the crop-failure tolerance limit(s) is a lower limit, or an upper limit, or both may be based on the numerical values of crop-failure scores assigned to corresponding crop-failure events and/or the method used to determine the accumulated crop-failure scores. For example, if the crop-failure scores are positive integers and/or fractions, and the method used to determine an accumulated crop-failure score is a summation of the positive integers and/or fractions the crop-failure tolerance limit will likely be an upper limit. Thus, crop-failure scores and accumulated crop-failure scores which are greater than an upper crop-failure tolerance limit will be "outside of the upper limit." Similarly, if the crop-failure scores are negative integers and/or fractions and the method of determining the accumulated crop-failure score is summation, then the crop-failure tolerance limit will likely be a lower limit. Thus, crop-failure scores and accumulated crop-failure scores which are less than a lower crop failure tolerance limit are "outside of the lower limit." One should note that these examples are not intended to be limiting as it is recognized than any number or combination of schemes of assigning the crop-failure scores and/or mathematically manipulating a plurality or crop-failure scores to determine an accumulated crop-failure score may be used with the methods set forth herein. In some embodiments, the crop-failure tolerance limit(s) may change based on the zoom level, optical or digital, of the camera device 200 and/or based on the stability (shakiness) of the image provided in the video stream.

Here, one or more accumulated crop-failure scores are generated using crop-failure data 232 which comprises individual crop-failure scores and/or other information calculated therefrom. In some embodiments, the crop-failure data 232 comprises individual crop-failure scores acquired within a rolling time window where crop-failure scores which are older than the time period defined by the rolling time window will decay or drop from the crop-failure data 232 as new crop-failure scores are acquired. In some embodiments, an accumulated crop-failure score may comprise a sum of the individual crop-failure scores acquired within the rolling time window or rolling number of scores (e.g., sum of the last three generated scores). In some embodiments, individual accumulated crop-failure scores are separately generated for each of the boundaries defining a current apparent field-of-view. For example, for the rectangular apparent fields-of-view illustrated each having four boundaries, a corresponding four accumulated crop-failure scores may be generated.

Generally, if at least one of the one or more crop-failure scores or accumulated crop-failure scores are equal to or are outside of the crop-failure tolerance limit, then the method

800 will continue to activity 840. If none of the one or more accumulate crop-failure scores are equal to or are outside of the crop-failure tolerance limit the method 800 will return to activity 810 to identify the locations of one or more conference participants within the next generated survey frame of the actual field-of-view. Beneficially, the accumulated crop-failure scores generated in activity 830 prevent a software application executing on the controller 206 from making unnecessary and/or frequent requests to adjust the actual and/or apparent field-of-views. For example, a relatively high scoring failure event such as a newly detected individual located outside of the apparent field-of-view may be fleeting if the newly detected individual quickly enters and leaves the video conferencing environment. In this example, it would be undesirable to adjust the apparent field-of-view as the newly detected individual enters the conference room only to adjust it back a moment later when the newly detected individual leaves the conference room. Advantageous, the rolling accumulated crop-failure scores described above may never reach the threshold value as the number of crop-failure scores assigned to the newly detected individual would be limited by the number of survey frames acquired during the short time period the individual was in the video conference environment.

At activity 840 the method 800 includes comparing a difference between the current apparent field-of-view and a desired apparent field-of-view. The desired apparent field-of-view may be determined using the one or more software applications 224 executing on the controller 206 to define the boundaries of a desired apparent field-of-view based on the locations of the one or more conference participants identified at activity 810. In some embodiments, the difference between the current apparent field-of-view and the desired apparent field-of-view is analyzed using an anti-motion sickness software application which may be stored in the memory 214 and executed by the processor 212. Typically, the anti-motion sickness software application is used to determine a difference between at least one attribute of the desired apparent field-of-view and at least one attribute of the current apparent field-of-view. The determined difference is then compared to the anti-movement rule 234.

At activity 850 the method 800 includes determining, whether an alteration to the current apparent field-of-view should be allowed. The determination of whether to allow the alteration to the current apparent field-of-view is based on the comparison of the difference between the at least one attribute of the current apparent field-of-view and the at least one attribute of the desired apparent field-of-view to the anti-movement rule. For example, in some embodiments a software application that is being executed by the processor 212 applies the anti-movement rule 234 to prevent adjustments that would be made to the apparent field-of-view and/or the actual field-of-view that might cause a viewer of the video stream to experience unwanted physical effects. In one example, the application of the anti-movement rule 234 will prevent changes to the video stream that would be perceived by a user as video flicker and/or a perceived swaying motion of portions of the field-of-view within the video stream which would cause motion sickness.

Generally, in determining whether the camera device 200 is allowed to change the current apparent field-of-view, the anti-motion sickness software application will apply the anti-movement rule 234 to analyze the differences between various attributes of the current apparent field-of-view and the desired apparent field-of-view, such as the magnitude of the change in the field-of-view between the current apparent field-of-view and the desired apparent field-of-view (e.g., percentage change in viewing area, amount of pan, tilt or zoom adjustment, the symmetry of the one or more participants within the frame, etc.), the frequency of adjustments being made to the apparent field-of-view (e.g., related to amount of time since last change, number of changes within a period of time, etc.), and/or the effect the change will have on the composition of the current apparent field-of-view (e.g., change in number of conference participants, does the field-of-view include a person that is speaking, etc.), and the whether the composition of the current apparent field-of-view is generally satisfactory, even if it is not necessarily optimal. In some embodiments, the anti-motion sickness software, applying the anti-movement rule 234, will analyze and compare the difference between the at least one attribute of the current apparent field-of-view and the desired apparent field-of-view to determine if the camera device 200 is allowed to change the current apparent field-of-view. In some embodiments, the anti-movement rule 234 includes one or more logical expressions, defined by software instructions stored in memory, that allow the anti-motion sickness software to determine that a change should be made to the apparent field-of-view based on an analysis of an attribute of the current apparent field-of-view and the desired apparent field-of-view and the anti-movement rule. In some embodiments, the anti-movement rule simply includes one or more anti-motion threshold values that are used to determine if change should be made to the apparent field-of-view by comparing an anti-motion threshold value with a determined difference between an attribute of the current apparent field-of-view and the desired apparent field-of-view.

In one example of the processes performed in activity 850, if the frequency in time of the requested changes are too high (i.e., frequency that a crop-failure score or the accumulated crop-failure score has reached or exceeded the threshold value is too high) the anti-movement rule 234 may be used to disallow or prevent the requested change from occurring. In another example, if the magnitude of the requested change is relatively low, the anti-movement rule 234 may be used to disallow or prevent the requested change from occurring. In yet another example, if the magnitude of the change requires only a small adjustment in the amount of zoom perceived by the viewer, such as about 50% or less, about 40% or less, about 30% or less, about 20% or less, or about 10% or less, and the composition of the current apparent field-of-view is generally satisfactory, for example, the upper bodies of the participants are within the boundaries of the current apparent field-of-view, the anti-movement rule 234 may be used to reject the request to change the current apparent field-of-view. In some embodiments, the magnitude of the requested change may be measured by the degree of pan and/or tilt required of the camera device 200 to provide the desired apparent field-of-view. For example, if the degree of pan and/or tilt requested is about 5 degrees or less, such as about 4 degrees or less, about 3 degrees or less, about 2 degrees or less, or about 1 degree or less, and the composition of the current apparent field-of-view of view is generally satisfactory, the anti-movement rule 234 may be used to reject the requested change to the apparent field-of-view.

If the anti-movement rule 234 allows the requested change to the current apparent field-of-view the method 800 will continue to activity 860. If the anti-movement rule 234 rejects the requested change the method 800 will return to activity 810 to identify the locations of one or more conference participants within the next generated survey frame of the actual field-of-view.

At activity 860 the anti-motion sickness software application, based on the requested desired apparent field-of-view of view determined in the prior activities, will then provide a control signal to the components within camera device which are used to adjust the apparent field-of-view, or actual field-of-view. The control signal can include parameters that will cause the camera device to alter its pan, tilt and/or zoom in a manner that will provide the desired apparent field-of-view of the conference room environment without causing a user that is viewing the changing video stream to experience unwanted physical effects due to the camera adjustment. At activity 860 the method 800 includes altering the apparent field-of-view to correspond to the boundaries defined by the desired apparent field-of-view, thus providing a new current apparent field-of-view. Once the apparent field-of-view has been altered, the accumulated crop-failure scores may be reset to a null value and the method 800 will return to activity 810.

In some embodiments, the activities 810-860 of method 800 may be serially repeated multiple times. In some embodiments, one or more of the activities 810-860 of method 800 may be left out during the execution of the method 800. In one example, activities 810, 840, or 850, or 840 and 850 may be omitted from at least one pass of multiple repeated passes through the activities performed in method 800.

In some embodiments, one or both of the crop-failure score generator 230 and the anti-movement rule 234 are generated using a machine learning AI algorithm (hereafter AI). Generally, the AI is trained using viewer input collected before, during, and/or after actual or simulated video conferencing sessions. Examples of information that may be collected from conference participants as viewer input include, without limitation, annoyance, fatigue, attentiveness, and disorientation, e.g., motion sickness. Viewer input may be collected before, during, and after the video conferencing session and may include both real time reactions and accumulated responses. For example, viewer input may include brief annoyances at changes to the apparent field-of-view that the viewer perceives as unnecessary, such as due to participants briefly engaging in a side conversation, and/or increasing frustration (accumulated annoyance) at a frequency of changes to the apparent field-of-view over the course of a video conferencing session.

In some embodiments, the AI may be trained using biological sensor information in addition to, or in place of, the viewer input. Biological sensor information typically includes any information which may be collected using a device configured to measure a physiological response (or lack thereof) to changes in the viewer experience over the course of a video conferencing session. Examples of sensors which may be used to train the machine learning AI include, without limitation, electroencephalogram EEG, electrocardiogram ECG, picopicogram PPG, galvanic skin response GSR, and/or wearable sensors used to detect a motion sickness response, such as nausea.

In some embodiments, the machine learning AI correlates the viewer experience information, e.g., the viewer input and/or biological response, to changes in the apparent field-of-view resulting from panning, tilting, and/or zooming (optically and/or digitally) the camera device 200 using the methods set forth herein. The correlation is used to generate or update the crop-failure score generator 230 and/or the anti-movement rule 234 which may be stored in the memory 214 of the camera device 200. The crop-failure score generator 230 may be used to determine the crop-failure scores applied for specific crop failure events during the method 800. The anti-movement rule 234 may be used to determine a viewer's likely response to a change in the apparent field-of-view based on a detected change in the video conferencing environment, such as a response to the perceived movement of the camera device from panning, tilting, and/or zooming the camera device 200. Based on a viewer's likely response as determined by the application of the anti-movement rule 234, the controller 206 may adjust the frequency, speed, and/or perceived movement of the camera device 200 when responding to detected changes within a video conferencing environment.

Beneficially, the method 800 may be used with any one or combination of the methods and devices described herein to improve the viewer experience by minimizing unnecessary, annoying, or frequent repositioning of the camera device as well as eliminating undesirable physical effects that may be associated therewith. In some embodiments, updated crop-failure score generator 230 and/or anti-movement rule 234 are periodically delivered to the camera device 200 via device-ware updates to beneficially provide users with a continuously improving video conferencing experience over the lifetime of a camera device.

Figure 9:
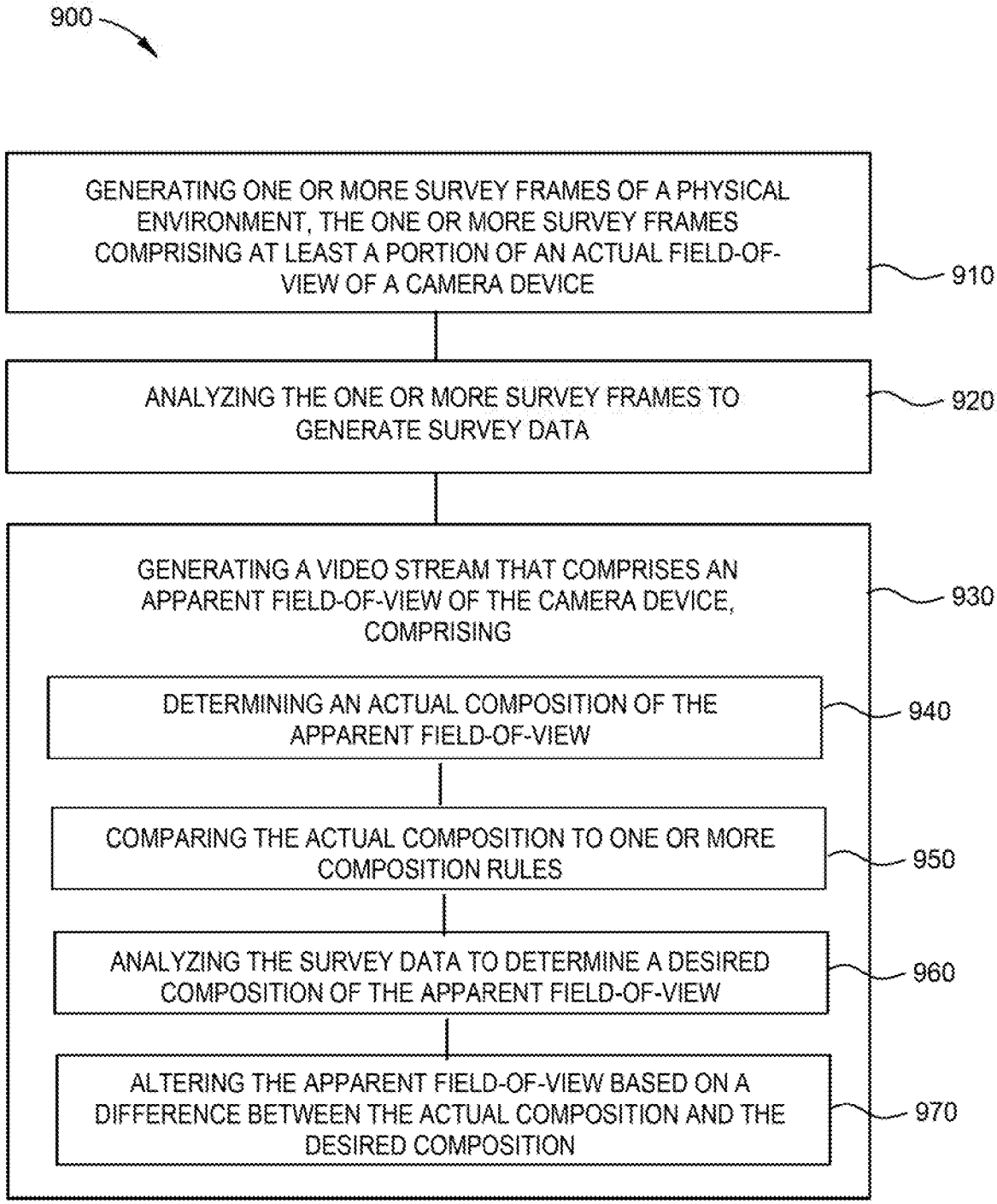
FIG. 9 is a diagram illustrating a method of method of monitoring the composition of a video stream of a physical environment, according to one embodiment, which may be used in any combination with the other methods set forth herein.

FIG. 9 is a diagram illustrating a method 900 of monitoring the composition of a video stream of a physical environment, such as a video conferencing environment, and altering the composition of the video stream based on changes to or within the physical environment. The method 900 may be used with the combined camera device 116 and controller 124 of FIG. 1 and/or with the camera device 200 of FIG. 2. The method 900 may be used in any combination, in whole or in part, with the other methods set forth herein.

At activity 910 the method 900 includes generating one or more survey frames of the physical environment, such as a video conferencing environment, where each of the one or more survey frames comprise at least a portion of an actual field-of-view of a camera device 200. In some embodiments, the one or more survey frames are generated between sequentially generated frames of an apparent field-of-view which will make up the video stream to-be-transmitted to a user device 110. The processes performed in activity 910 may include one or more of the processes described above in relation to FIG. 3, such as the processes performed in activity 340.

In some embodiments, the method 900 further includes transmitting the video stream to the user device 110. Typically, the one or more survey frames are extracted from the video stream before the video stream is transmitted to the user device 110. In some embodiments, a video conferencing software application which is being executed on the user device 110 is configured to receive the video stream and transmit the video stream to a remote video conferencing device for display.

At activity 920 the method 900 includes analyzing the one or more survey frames to generate survey data 228, such as described above in activity 345 of the method 300.

At activity 930 the method 900 includes generating a video stream of an apparent field-of-view by use of the camera device 200. Typically, the apparent field-of-view is of a portion of the actual field-of-view and is achieved by using a digital zoom feature of the camera device, as discussed above. Here, generating the video stream of the apparent field-of-view includes analyzing the apparent field-of-view, as set forth in activities to determine an actual composition thereof and comparing the actual composition of the apparent field-of-view to one or more composition rules as respectively set forth in activities 940 and 950.

Here, at least some of the one or more composition rules may be based on general principles of photography, such as one or more of the negative space surrounding the one or more objects, the negative space between the one or more objects and a boundary of the apparent field-of-view, the asymmetry of the location of the one or more objects within the apparent field-of-view, a direction one or more objects are facing within the apparent field-of-view, a depth of field between at least two objects, and a ratio of a depth to width of the physical environment relative to the camera device. When the objects are conference participants, the one or more composition rules may include any one of, or a combination of, negative space surrounding the one or more participants, negative space between the one or more participants and a boundary of the apparent field-of-view, asymmetry of the location of the one or more participants within the apparent field-of-view, a direction one or more participants are facing within the apparent field-of-view, a depth of field between at least two participants, and a ratio of a depth to width of the physical environment relative to the camera device.

At activity 960, the method 900 includes analyzing the survey data using the one or more composition rules to determine a desired composition of the apparent field-of-view and altering the apparent field-of-view based on a difference between the actual composition and the desired composition. In some embodiments, the difference between the actual composition and the desired composition is based on a change in location of one or more objects within the physical environment between one or more generated survey frames. In embodiments where the physical environment is a video conferencing environment the objects may include conference participants.

In some embodiments, method 900 further includes generating a crop-failure score based on the comparison of the actual composition of the apparent field-of-view to the one or more composition rules and comparing the crop-failure score or an accumulated crop-failure score to a crop-failure tolerance limit. Here, the accumulated crop-failure score comprises a plurality of generated crop-failure scores. Typically, in those embodiments, the apparent field-of-view is not altered until the crop-failure score or the accumulated crop-failure score is equal to or outside of the crop-failure tolerance limit.

Generally, generating the crop-failure score includes comparing a location of one or more participants relative to one or more boundaries of the apparent field-of-view to a plurality of predetermined crop failure events each having a corresponding predetermined crop-failure score. The one or more crop-failure scores may be generated for the respective locations of at least one of the one or more participants based on the comparison to the plurality of predetermined crop-failure events. In some embodiments, the accumulated crop-failure score comprises a plurality of generated crop-failure scores taken within a rolling time window and individual crop-failure scores acquired outside of the rolling time window are not included in the determination of the accumulated crop-failure score.

At activity 970, the method 900 includes altering the apparent field-of-view based on a difference between the actual composition and the desired composition. In some embodiments, the apparent field-of-view is altered at activity 970 after comparing the difference between the actual composition and the desired composition with the anti-movement rule 234 and then a determination is made, based on the comparison, that the alteration to the apparent field-of-view should be made. Altering the apparent field-of-view may include any one or a combination of panning, tilting, optically zooming, and digitally zooming the camera device 200. In some embodiments, altering the apparent field-of-view also alters the actual field-of-view.

Beneficially, the method 900 may be used with any one or combination of the methods and devices described herein to improve a viewer's experience by adjusting the composition of a video stream based on changes therein. Advantageously, the method dampens the effect of automatic adjustments by minimizing unnecessary, annoying, or frequent repositioning of the camera device as well eliminating undesirable physical effects that may be associated therewith.

While the foregoing is directed to embodiments of the present disclosure, other and further embodiments of the disclosure may be devised without departing from the basic scope thereof, and the scope thereof is determined by the claims that follow.

The invention claimed is:

1. A video streaming system, comprising:
 a camera device; and
 a non-transitory computer readable medium that includes instructions which when executed by a processor are configured to cause the video streaming system to perform a method, the method comprising:
  generating one or more survey frames of a physical environment, wherein each of the one or more survey frames comprise at least a portion of an actual field-of-view of the camera device;
  analyzing the one or more survey frames to generate survey data; and
  generating a video stream that comprises an apparent field-of-view of the physical environment, comprising:
   analyzing the apparent field-of-view to determine an actual composition thereof;
   comparing the actual composition of the apparent field-of-view to one or more composition rules;
   analyzing the survey data, using the one or more composition rules, to determine a desired composition of the apparent field-of-view;
   generating a crop-failure score based on the comparison of the actual composition of the apparent field-of-view to the one or more composition rules;
   comparing the crop-failure score or an accumulated crop-failure score to a crop-failure tolerance limit, wherein the accumulated crop-failure score comprises a plurality of generated crop-failure scores; and
   altering the apparent field-of-view based on a difference between the actual composition and the desired composition,
   wherein the apparent field-of-view is not altered until the crop-failure score or the accumulated crop-failure score is equal to or outside of the crop-failure tolerance limit.

2. The video streaming system of claim 1, further comprising a user device disposed in communication with the camera device, wherein the user device comprises:
 the processor; and
 the non-transitory computer readable medium that includes the instructions which when executed by the processor are configured to perform at least portions of the method.

3. The video streaming system of claim 1, wherein the camera device comprises:
 an image sensor;

a lens, wherein one or both of the lens and the image sensor are movable with respect to the other to change a focal length of the camera device;

the processor; and the non-transitory computer readable medium.

4. The video streaming system of claim 1, wherein the one or more survey frames are generated between sequentially generated frames of the apparent field-of-view, and wherein the method further comprises:

transmitting the video stream to a user device; and extracting one of the one or more survey frames from the video stream before the video stream is transmitted to the user device.

5. A video streaming system, comprising:

a camera device; and a non-transitory computer readable medium that includes instructions which when executed by a processor are configured to cause the video streaming system to perform a method, the method comprising:

generating one or more survey frames of a physical environment, wherein each of the one or more survey frames comprise at least a portion of an actual field-of-view of the camera device;

analyzing the one or more survey frames to generate survey data; and generating a video stream that comprises an apparent field-of-view of the physical environment, comprising:

analyzing the apparent field-of-view to determine an actual composition thereof;

comparing the actual composition of the apparent field-of-view to one or more composition rules;

analyzing the survey data, using the one or more composition rules, to determine a desired composition of the apparent field-of-view; and altering the apparent field-of-view based on a difference between the actual composition and the desired composition, wherein the apparent field-of-view is altered after comparing the difference between the actual composition and the desired composition with an anti-movement rule and a determination is made, based on the comparison of the difference to then anti-movement rule, that the alteration to the apparent field-of-view should be made.

6. The video streaming system of claim 1, wherein the difference between the actual composition and the desired composition is based on a change in location of one or more objects within the physical environment between one or more generated survey frames.

7. The video streaming system of claim 1, wherein the one or more composition rules are based on one or a combination of negative space surrounding one or more objects, negative space between the one or more objects and a boundary of the apparent field-of-view, asymmetry of a location of the one or more objects within the apparent field-of-view, a direction one or more objects are facing within the apparent field-of-view, a depth of field between at least two objects, and a ratio of a depth to width of the physical environment relative to the camera device.

8. A video streaming system, comprising:

a camera device, comprising:

an image sensor; and a lens, wherein one or both of the lens and the image sensor are movable with respect to the other to define an actual field-of-view of a first portion of a physical environment; and a non-transitory computer readable medium that includes instructions which when executed by a processor are configured to cause the video streaming system to perform a method comprising:

(a) generating a crop-failure score based on a location of one or more participants in the first portion of a physical environment, wherein the crop-failure score is based on the location of the one or more participants relative to one or more boundaries of a first apparent field-of-view contained within a video stream;

(b) comparing the generated crop-failure score or an accumulated crop-failure score to a crop-failure tolerance limit, wherein the accumulated crop-failure score comprises a plurality of generated crop-failure scores;

(c) determining boundaries of a desired second apparent field-of-view based on the locations of the one or more participants in the first portion of the physical environment; and (d) altering the video stream by changing from the first apparent field-of-view to the second apparent field-of-view when the generated crop-failure score or the accumulated crop-failure score is equal to or outside of the crop-failure tolerance limit.

9. The video streaming system of claim 8, wherein the method further comprises:

identifying a location of the one or more participants within the actual field-of-view of the physical environment; and selecting the one or more boundaries of the first apparent field-of-view of the video stream, based on the identified location of the one or more participants, prior to generating a crop-failure score.

10. The video streaming system of claim 8, wherein altering the video stream from the first apparent field-of-view to the second apparent field-of-view also requires the camera device to adjust from a first actual field-of-view to a second actual field-of-view.

11. The video streaming system of claim 8, wherein identifying the location of the one or more participants within the actual field-of-view of the physical environment comprises:

defining the actual field-of-view;

generating a plurality of survey frames that each comprise at least a portion of the actual field-of-view; and analyzing the plurality of survey frames to generate survey data, wherein the survey data comprises the respective locations of the one or more participants within the actual field-of-view.

12. The video streaming system of claim 8, wherein the actual field-of-view is provided by one or a combination of panning, tilting, and optically zooming the camera device to optically frame the first portion of the physical environment, the first apparent field-of-view is defined by digitally zooming the camera device to digitally frame a second portion of the physical environment, and the first apparent field-of-view is a portion of the actual field-of-view.

13. The video streaming system claim 8, wherein the generating the crop-failure score comprises:

comparing the respective locations of one or more participants within the one or more boundaries of the first apparent field-of-view to a plurality of predetermined crop-failure events each having a corresponding predetermined crop-failure score; and generating one or more crop-failure scores for the respective locations of at least one or more participants based on the comparison to the plurality of predetermined crop-failure events.

14. The video streaming system of claim 13, wherein the method further comprises:
generating a plurality of individual accumulated crop-failure scores for each of the one or more participants within the first apparent field-of-view relative to the one or more boundaries thereof, and
comparing each of the individual accumulated crop-failure scores to the crop-failure tolerance limit.

15. The video streaming system of claim 8, wherein
the accumulated crop-failure score is compared with the crop-failure tolerance limit,
the accumulated crop-failure score comprises a plurality of generated crop-failure scores taken within a rolling time window, and
individual crop-failure scores acquired outside of the rolling time window are not included in the determination of the accumulated crop-failure score.

16. A video conferencing system, comprising:
a camera device, comprising:
an image sensor; and
a lens, wherein one or both of the lens and the image sensor are movable with respect to the other to define an actual field-of-view of a first portion of a physical environment; and
a non-transitory computer readable medium that includes instructions which when executed by a processor are configured to cause the camera device to perform a method comprising:
optically framing a first portion of a video conferencing environment to provide a first actual field-of-view;
digitally framing a second portion of the video conferencing environment to provide a first apparent field-of-view, wherein the first apparent field-of-view is encompassed within the first actual field-of-view; and
generating a video stream of the first apparent field-of-view, comprising:
analyzing the apparent field-of-view to determine an actual composition thereof;
comparing the actual composition of the apparent field-of-view to one or more composition rules;
generating a crop-failure score based on the comparison of the actual composition of the apparent field-of-view to the one or more composition rules
comparing the crop-failure score or an accumulated crop-failure score to a crop-failure tolerance limit, wherein the accumulated crop-failure score comprises a plurality of generated crop-failure scores; and
altering the apparent field-of-view based on a difference between the actual composition and a desired composition,
wherein the apparent field-of-view is not altered until the crop-failure score or the accumulated crop-failure score is equal to or outside of the crop-failure tolerance limit.

17. The video conferencing system of claim 16, wherein the non-transitory computer readable medium is a memory of a user device, and wherein the user device is in communication with the camera device.

18. The video conferencing system of claim 16, wherein the method further comprises:
generating survey data using a plurality of survey frames that each comprises at least a portion of the first actual field-of-view that is different from the first apparent field-of-view; and
detecting changes in the survey data over time.

* * * * *